US010776136B2

(12) United States Patent
Brown et al.

(10) Patent No.: US 10,776,136 B2
(45) Date of Patent: Sep. 15, 2020

(54) TRANSITIONING BETWEEN INTERFACE MODES BASED ON STORED STATE INFORMATION

(71) Applicant: Microsoft Technology Licensing, LLC, Redmond, WA (US)

(72) Inventors: Shawn Michael Brown, Sammamish, WA (US); Scott David Schenone, Seattle, WA (US); Darcie Alison Gurley, Seattle, WA (US); Patrick Joseph Derks, Seattle, WA (US); Sammy Chiu, Seattle, WA (US); Bret Paul Anderson, Seattle, WA (US); Max Michael Benat, Redmond, WA (US); James David Peter Drage, Seattle, WA (US); Jason Michael Deakins, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 15/993,652

(22) Filed: May 31, 2018

(65) Prior Publication Data

US 2019/0370025 A1 Dec. 5, 2019

(51) Int. Cl.
*G06F 9/451* (2018.01)
*G06F 3/0488* (2013.01)
*G06F 3/0489* (2013.01)

(52) U.S. Cl.
CPC .......... *G06F 9/451* (2018.02); *G06F 3/04886* (2013.01); *G06F 3/04897* (2013.01)

(58) Field of Classification Search
CPC .............................. G06F 9/451; G06F 3/04886
See application file for complete search history.

(56) References Cited

U.S. PATENT DOCUMENTS

| 9,652,129 B1* | 5/2017 | Caballero | H04L 65/60 |
| 2008/0266255 A1 | 10/2008 | Lawson et al. | |
| 2012/0005596 A1* | 1/2012 | Carlson | G06F 9/445 |
| | | | 715/751 |
| 2012/0081270 A1* | 4/2012 | Gimpl | G06F 1/1616 |
| | | | 345/1.3 |

OTHER PUBLICATIONS

"Windows 8," available at <<https://en.wikipedia.org/wiki/Windows_8>>, Wikipedia online article, accessed on May 23, 2018, 26 pages.
Search Report and Written Opinion in PCT/US2019/033027, dated Aug. 12, 2019, 14 pages.

* cited by examiner

*Primary Examiner* — Li P Sun

(57) ABSTRACT

A technique is described herein for managing the manner in which a computing device transitions from one user interface (UI) mode to another. The technique stores state information that describes prior states of UI features that have appeared in previous UI presentations, with respect to different UI modes. When transitioning from a first UI presentation (associated with a first UI mode) to a second UI presentation (associated with a second UI mode), the technique leverages the state information to restore one or more aspects of a prior-encountered state associated with the second UI mode.

20 Claims, 11 Drawing Sheets

OVERVIEW OF OPERATION OF THE UI MANAGEMENT COMPONENT (UIMC)
1302

PRESENT A FIRST UI PRESENTATION USING AT LEAST ONE FIRST OUTPUT DEVICE, THE FIRST UI PRESENTATION PROVIDING A FIRST SET OF ONE OR MORE FIRST-SET UI FEATURES, PROVIDED IN A MANNER THAT CONFORMS TO A FIRST UI MODE. A USER INTERACTS WITH THE FIRST UI MODE USING AT LEAST ONE FIRST INPUT DEVICE.
1304

RECEIVE ONE OR MORE INPUT SIGNALS, INDICATING THAT A STATE-CHANGE EVENT HAS OCCURRED TO CHANGE A STATE OF AT LEAST ONE FIRST-SET UI FEATURE ASSOCIATED WITH THE FIRST UI PRESENTATION
1306

UPDATE THE FIRST UI PRESENTATION PROVIDED BY THE FIRST OUTPUT DEVICE BASED ON THE INPUT SIGNAL(S)
1308

UPDATE FIRST-MODE STATE INFORMATION IN A DATA STORE BASED ON THE INPUT SIGNAL(S), THE FIRST-MODE STATE INFORMATION DESCRIBING RESPECTIVE STATES OF UI FEATURES THAT WERE PROVIDED BY PREVIOUS PRESENTATIONS CONFORMING TO THE FIRST UI MODE
1310

DETERMINE, BASED ON ONE OR MORE OTHER INPUT SIGNALS, WHETHER TO TRANSITION TO A SECOND UI MODE
1312

IF THE DETERMINING OPERATIONS RESULTS IN AN AFFIRMATIVE RESPONSE, RETRIEVE SECOND-MODE STATE INFORMATION FROM THE DATA STORE, THE SECOND-MODE STATE INFORMATION DESCRIBING RESPECTIVE STATES OF UI FEATURES THAT WERE PROVIDED BY PREVIOUS PRESENTATIONS CONFORMING TO THE SECOND UI MODE
1314

PRESENT A SECOND UI PRESENTATION USING AT LEAST ONE SECOND OUTPUT DEVICE, THE SECOND UI PRESENTATION SHOWING A SECOND SET OF ONE OR MORE SECOND-SET UI FEATURES THAT CONFORM TO THE SECOND UI MODE. THE USER INTERACTS WITH THE SECOND UI MODE USING AT LEAST ONE SECOND INPUT DEVICE. THIS OPERATION IS PERFORMED BASED ON THE SECOND-MODE STATE INFORMATION. IT HAS THE EFFECT OF RESTORING AT LEAST ONE SECOND-SET UI FEATURE TO A PREVIOUSLY-ENCOUNTERED STATE.
1316

FIG. 13

TRANSITIONING BETWEEN INTERFACE MODES BASED ON STORED STATE INFORMATION

BACKGROUND

Users may currently interact with applications using various kinds of computing devices. In many cases, different types of computing devices use different respective user interface (UI) modes. For example, a traditional personal computing device may allow a user to interact with applications via respective window instances provided on a desktop UI presentation. In contrast, a tablet-type computing device may allow a user to interact with applications via one or more tile instances that together extend over the entire surface of the device's UI presentation. The diversity of UI modes may introduce technical and user experience-related challenges, particularly with respect to the manner in which a user transitions among different UI modes.

SUMMARY

A technique is described herein for managing the manner in which a computing device transitions from one user interface (UI) mode to another. The technique stores state information that describes prior states of UI features that have appeared in previous UI presentations, with respect to different UI modes. When transitioning from a first UI presentation (associated with a first UI mode) to a second UI presentation (associated with a second UI mode), the technique leverages the state information to restore one or more aspects of a previously-encountered state associated with the second UI mode. For example, when transitioning from a desktop UI mode to a tablet UI mode, the technique can present a tile instance in a tablet UI presentation (associated with a counterpart window instance in a desktop UI presentation) based on the last-encountered state of that same tile instance in the tablet UI mode (if there was, in fact, a last-encountered state of that same tile instance).

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 shows another way of expressing aspects of the process of FIG. 11.

Figure 1:
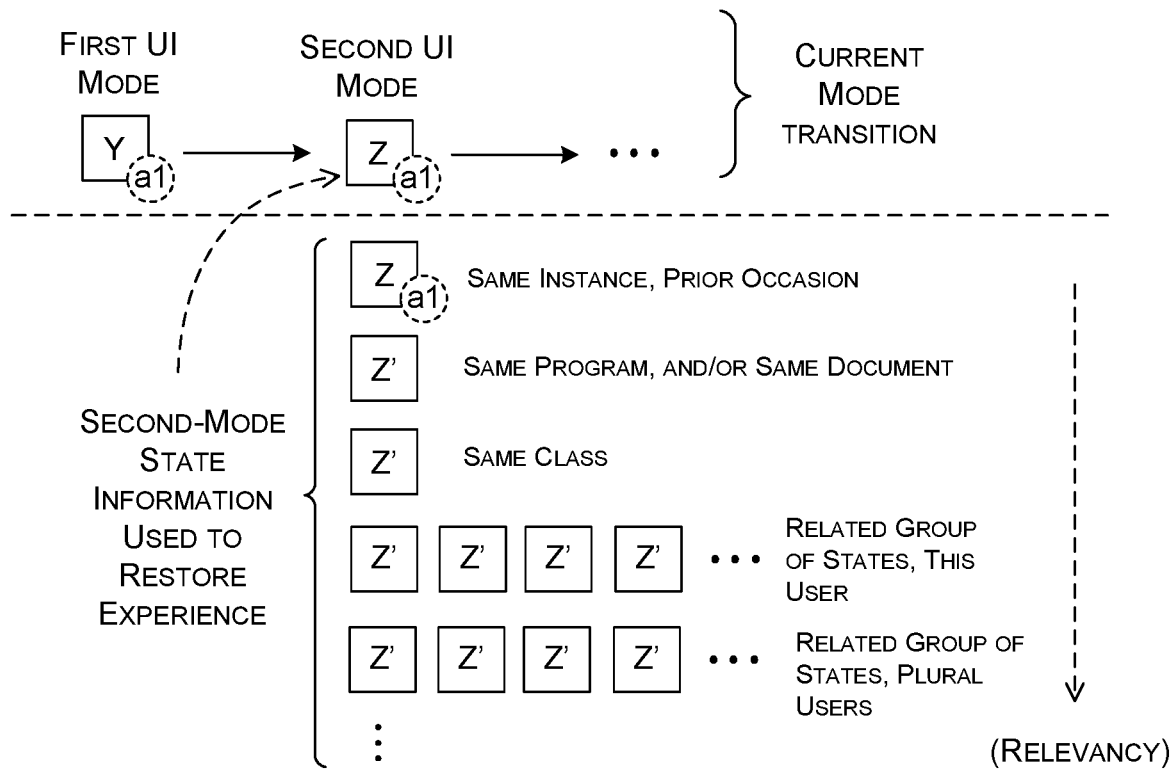
FIG. 1 provides a simplified example of the operation of a user interface management component (UIMC), which manages transition between a first UI mode and a second UI mode.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing environment for facilitating transition among different user interface modes. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The term "component" refers to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A user interface management component (UIMC) manages the presentation of user interface (UI) features to users via UI presentations, with respect to two or more UI modes. A UI presentation may present information to users in any form or combination of forms. For example, a UI presentation may correspond to a graphical UI presentation provided by one or more display devices. In that context, the UI features may correspond to graphical object instances of any kind(s), such as window instances, menu instances, control element instances, etc. Alternatively, or in addition, a UI presentation may correspond to an audio presentation provided by one or more speakers. In that context, the UI features may correspond to audible items, such as portions of an interactive dialog, and so on. However, to facilitate explanation, the following description will present examples in which the UI presentations provide information in visual form on one or more display devices.

A UI mode refers to a paradigm for presenting UI features, as governed by a set of rules. A paradigm may also govern the behavior of each UI feature once it is presented. For example, in a desktop UI mode, the UIMC presents potentially overlapping window instances on a graphical UI presentation. In a tablet UI mode, the UIMC presents one or more non-overlapping tile instances that collectively cover the entire surface of a graphical UI presentation. These two examples are merely illustrative. In another UI mode, the UIMC presents information in a particular manner which complements a gaming platform. In another UI mode, the UIMC presents information in a manner that complements an augmented reality platform or a virtual reality platform, and so on.

The state of a UI feature governs any aspect of the manner in which it is provided to a user in the context of a particular UI mode. For instance, for a graphical UI feature, the state can refer, without limitation, to any of: the UI feature's size; the UI feature's appearance; the UI feature's position in a UI presentation; the UI feature's layout with respect to other UI features; the UI feature's behavioral properties, etc. For an audio-based UI feature, the state can refer, without limitation, to any of the UI feature's volume, speed, language, accent, etc. The state can also refer to any other kinds of metadata, such as status-related information, playback time-related information, etc. More generally, the term "state information" refers to one or more information items pertaining to state.

This disclosure will emphasize the case in the first and second UI modes correspond to different UI paradigms associated with different respective sets of rules. But in other cases, the first UI mode and the second UI mode may rely on the same UI paradigm. For example, the two UI modes may correspond to two instantiations of a paradigm that provides overlapping graphical window instances. In those kinds of situations, the two UI modes may differ principally with respect to physical constraints associated with the input devices and/or the output devices used to interact with presentations in the two UI modes. Alternatively, the two UI modes may principally differ with respect to their respective stored state information.

Some underlying program resource generates each UI feature. For example, an application or operating system component may generate a UI feature. Two UI features may represent two different instantiations of the same program resource. For example, two window instances may represent two different activations of a same program at different respective times. In this case, the two different window instances will have different respective IDs. In another case, two UI features may represent two visual representations of a single activation of a program resource. For example, a window instance and a tile instance may represent the same instantiation of an underlying application.

By way of overview, the UIMC manages a transition from a first UI presentation (associated with a first UI mode) to a second UI presentation (associated with a second UI mode). The UIMC performs this task upon detecting an environment-specific triggering event. For example, the UIMC may transition between two UI modes upon receiving an explicit instruction from a user to perform the transition. Or the UIMC may switch between two UI modes in response to other actions taken by the user, such as when the user replaces a first output device with another output device, e.g., as when a user replaces a first display device with a larger display device. Alternatively, or in addition, the UIMC may switch between two UI modes when it detects that the user replaces a first input device with a second input device, e.g., when a user replaces a mouse input device with a digital pen. Generally, the UIMC responds to these kinds of user actions by transitioning to a new UI mode that is most appropriate for the new input/output context established by the user.

More specifically, prior to a transition to a second UI mode, the UIMC presents a first UI presentation that includes a first set of UI features, referred to herein as first-set UI features. Following the transition, the UIMC presents a second UI presentation that includes a second set of UI features, referred to herein as second-set UI features. One task of the UIMC in the above scenario is to determine how to compose the second UI presentation. It does so based on context information that describes one or more aspects of the contextual situation in which the second UI presentation is being generated.

For instance, in generating the second UI presentation, the UIMC takes into consideration state information that describes the way in which UI features have been previously presented in the second UI mode, on one or more prior occasions. This information is referred to herein as second-mode state information. Broadly stated, the UIMC relies on the second-mode state information to restore at least one second-set UI feature to a previously-encountered state.

FIG. 1 presents a simplified overview of the operation of the UIMC. Assume that a first UI presentation presents a first-set UI feature Y in a first UI mode. Upon a triggering event, the UIMC presents a second UI presentation that includes a second-set UI feature Z. Assume here that the UI feature Y and the UI feature Z represent two different representations of the same instantiation of an underlying program resource a1. The UIMC determines the state of the UI feature Z in the second UI presentation, such as its size, position, etc. in the second UI presentation. It does this based on at least the second-mode state information.

More specifically, the second-mode state information can store information items having varying degrees of relevance to the UI feature Z that the UIMC seeks to place in the second UI presentation. In a first case, assume that, on a prior occasion, the UIMC has placed the same UI feature Z on the second UI presentation. In other words, this previous UI feature represents the same instantiation of the program resource a1. In one implementation, the UIMC restores the UI feature Z to the same state (e.g., the same location, size, etc.) at which it was last presented on the second UI presentation.

In a second case, assume that the specific UI feature Z has not yet appeared in the second UI presentation. In this case, the UIMC can rely on other relevant information items in the second-mode state information to determine how to place the UI feature Z in the second UI presentation. For example, the UIMC can consult the second-mode state information to determine where a last UI feature Z' for program a1 was placed in the second UI presentation. The UIMC can then place the UI feature Z in accordance with that same state. Note however, that the current UI feature Z and the prior UI feature Z' correspond to two separate instantiations of the program resource a1.

In another case, assume that the user is interacting with a content item C (such as a text-based document, image, audio file, etc., or any combination thereof) via the UI feature Z, using the program resource a1. On previous occasions, one or more other program resources may have processed the same content item C. Accordingly, the UIMC can access the second-mode state information to determine how a last such relevant UI feature Z' was placed in the second UI presentation. Here, the last UI feature Z' need not correspond to an instantiation of the same program resource a1, so long as the user used it to process the same content item C. Again, the UIMC can leverage the second-mode state information by placing the UI feature Z at the identified prior state of the last UI feature Z'.

In another case, assume that the program resource a1 is a member of a particular class of program resources. Here, the UIMC can identify the last UI feature Z' that any program resource in this class placed in the second UI presentation. In a related case, assume that the content item C is a member of a particular class of content items. Here, the UIMC can determine the last UI feature Z' in which some program resource operated on a member of this class.

In each of the above-identified cases, the UIMC relies on a single prior state in determining how to place the UI feature Z in the second UI presentation. But the UIMC can also take into consideration plural such prior placements. For example, the UIMC can identify the last n placements of UI features produced by the same program resource a1. The UIMC can then place the UI feature Z at a state that is based on the identified group of prior states. For example, the UIMC can determine a final position for a window instance that reflects the most popular position in a group of prior window instance positions. Or the UIMC can determine a final position for a window instance that corresponds to an average (e.g., center of mass) of several prior positions, etc.

A user can define criteria for forming a group in any manner, across one or more dimensions. For instance, in response to a user's configuration setting, the UIMC can treat two UI features as related if they refer to the exact same instantiation of the program resource a1, or if they refer to two separate instantiations of the same program resource a1, or if they refer to instantiations from program resources belonging to the same class, etc. The UIMC can also identify a span of time over which prior UI features can be considered related. The UIMC can also identify whether it is appropriate to consider only prior UI features presented to the current user, or UI features presented to a group of users. The group of users can be defined with respect to any level of granularity, e.g., by defining the group to encompass all users, or just those users who share one or more characteristics in common with the current user.

In one mode of operation, the UIMC can identify and utilize the most relevant second-mode state information item in determining how to place the UI feature Z in the second UI presentation. For example, the UIMC can use information regarding a prior placement of the same UI feature Z in the second UI presentation (corresponding to the same instantiation of the program resource a1), if this information is available; if that information is not available, the UIMC can progress down a hierarchy of information items until it finds information it can use to place the UI feature Z. Alternatively, or in addition, the UIMC can rely one two or more of the information items described above in determining how to place the UI feature Z in the second UI presentation. In performing this task, the UIMC can apply an appropriate weight value to each information item that reflects its relevance to the UI feature Z.

Figure 2:
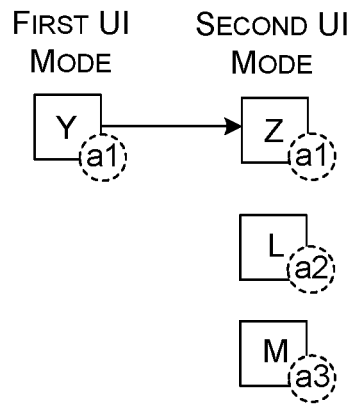
FIG. 2 provides another simplified example which represents a variation of the example of FIG. 1.

FIG. 2 shows another aspect of the operation of the UIMC. In this case, assume that the UIMC presents a UI feature reference Y in a first UI presentation, in accordance with a first UI mode. Upon a triggering event, it generates a UI feature Z in a second UI presentation, in a second UI mode. Again assume that the UI feature Y and the UI feature Z represent the same instantiation of the underlying program resource a1. In addition, the UIMC presents a UI feature L (generated by a program resource a2) and a UI feature M (generated by a program resource a3) on the second UI presentation. It displays these UI features (L, M) even though there are no counterpart UI features in the first UI presentation. The UIMC can decide to present the two new UI features (L, M) based on an environment-specific rule.

For instance, the rule may be predicated on the reasoning that the UI features (L, M) provide complementary services to whatever function is performed by the UI feature Z in the second UI mode, and therefore it is appropriate to automatically activate them for the benefit of the user.

More generally, the UIMC can take several contextual factors into consideration in deciding how to compose the second UI presentation. As indicated in the description above, the UIMC can take into consideration: (a) the identity of the first UI mode; (b) the identity of the second UI mode; (c) the first set of UI features that remain active in the first UI presentation at the time of the transition; (d) the second-mode state information, etc. It can also take into consideration the current location of the user, the current time, the preferences of the user (both explicitly stated and learned), and so on.

Finally, although FIGS. 1 and 2 were described in the context of a transition from the first UI mode to the second UI mode, the UIMC performs a complementary operation if the user transitions back to the first UI mode, or if the user advances to a third UI mode, etc. For example, in returning to the first UI mode, the UIMC will take into consideration first-mode state information that reflects prior placement of UI features in the first UI presentation. By leveraging this information, the UIMC can restore one or more aspects of a previous first UI presentation.

Figure 3:
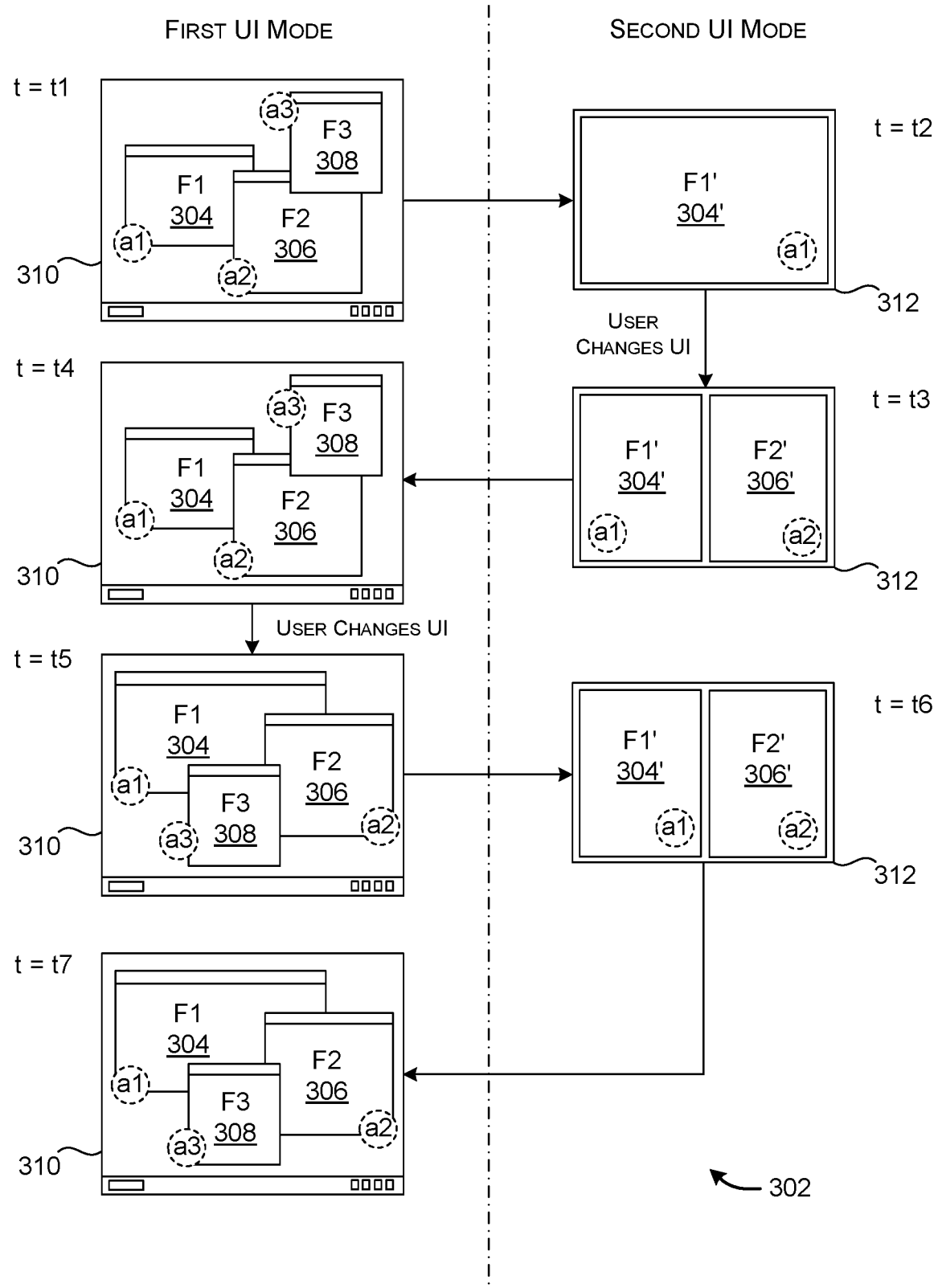
FIG. 3 shows a specific scenario in which the UIMC manages transitions among two UI modes.

FIG. 3 shows a first scenario 302 that illustrates the operation of the UIMC in greater detail. At time t1, the UIMC displays a first set of three window instances (304, 306, 308) on a first UI presentation 310, in conformance with a first UI mode (corresponding to a desktop UI mode). In the terminology specified above, these window instances (304, 306, 308) constitute first-set UI features (F1, F2, F3). A first display device may display the first UI presentation 310. For example, the first display device may correspond to a display monitor coupled to a desktop computing device or a display device associated with a laptop computing device, etc.

At time t2, the UIMC switches to a second UI mode. In this mode, the UIMC displays tile instances (304', 306', 308') in accordance with a tile UI mode on a second UI presentation 312 (wherein only the tile instance 304' is visible at time t2). In the terminology specified above, these tile instances (304', 306', 308') constitute second-set UI features (F1', F2', F3'). A second display device may provide the second UI presentation 312. The second display device may be the same or different than the first display device.

In this example, assume that: the window instance 304 and the tile instance 304' represent the same instantiation of an application a1 in a current application session; the window instance 306 and the tile instance 304' represent the same instantiation of an application a2; and the window instance 308 and the tile instance 308' represent the same instantiation of an application a3.

Further assume that, prior to time t1, the user had previously interacted with the three illustrated tile instances (304', 306', 308') in the context of the second UI mode. Further assume, that in a last-encountered state, the second UI presentation 312 functionally arranged the tile instances (304', 306', 308') in a stack, with the first tile instance 304' being on top of the stack and encompassing the entire surface of the second UI presentation 312. Finally assume that, at the time of the transition from the first UI mode to the second UI mode, the second-mode state information reflects the above-described tile-stacked configuration.

Given the above scenario, at time t2, the UIMC reads the second-mode state information for the second UI mode. It then duplicates the above-described configuration of tile instances, e.g., by displaying the first tile instance 304' such that it covers the entire surface of the second UI presentation 312. The UIMC functionally provides the other tile instances (306', 308') as positioned "behind" the first tile instance 304'. As such, assume that all three tile instances (304', 306', 308') remain active in the second UI presentation 312.

In time t3, assume that the user next manipulates the UI presentation 312 by pulling up the second tile instance 306', and placing that tile instance 306' next to the first tile instance 304'. In response, the UIMC stores second-mode state information which describes this new arrangement of UI features.

At time t4, assume that the UIMC again transitions back to the first UI mode. The UIMC responds by restoring the first UI presentation 310 to the same state associated with time t1. The UIMC performs this task by retrieving and acting on first-mode state information which describes the first UI presentation 310 at time t1.

At time t5, assume that the user changes the positions and sizes of the three window instances (304, 306, 308) on the first UI presentation 310. The UIMC again stores first-mode state information which reflects these changes. At time t6, assume that the user again transitions to the second UI mode. The UIMC responds by restoring the second UI presentation 312 to the same state associated with time t3. The UIMC performs this task by retrieving and acting on second-mode state information associated with time t3. Finally, at time t7, assume that the UIMC transitions once again back to the first UI mode. The UIMC responds by restoring the first UI presentation 310 to the same state associated with the time t5.

Note that, in the first scenario 302 shown in FIG. 3, changes in state are caused by UI-related actions taken by the user, e.g., as when the user moves a window instance or resizes a window instance. But more generally, a UI presentation can change in response to any state-change event, including events not attributed to actions explicitly taken by the user via an input device. For example, the UIMC can detect the end of a time-out period, which has the effect of automatically changing a UI presentation. In another case, the UIMC can detect the introduction (or removal) of a new program or peripheral device, which has the effect of changing the UI presentation. In another case, the UIMC can detect the arrival of a new notification or the like, which has the effect of changing the UI presentation, and so on. On each such occasion, the UIMC will store state information that describes the new state of the UI presentation.

Figure 4:
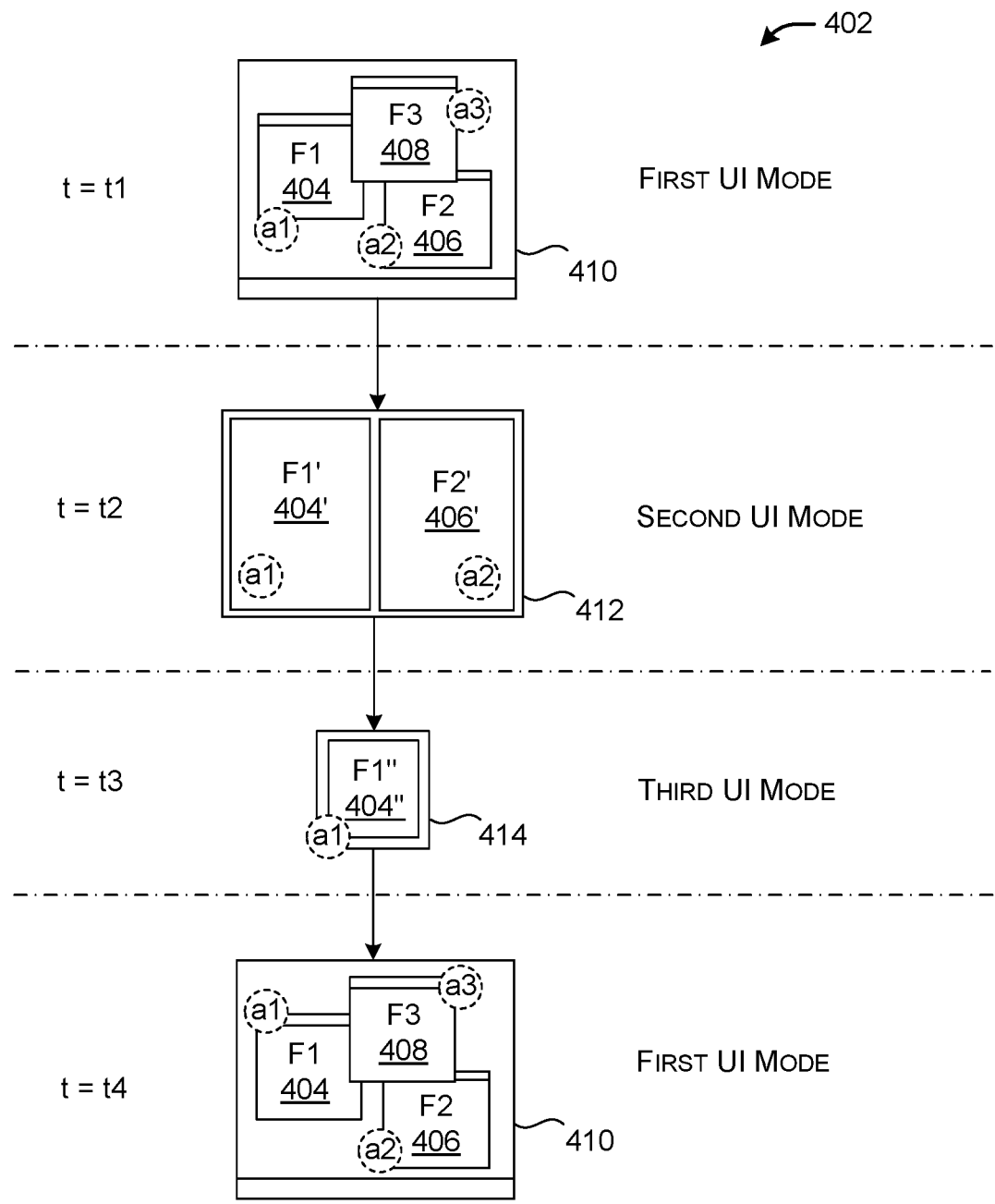
FIG. 4 shows another scenario in which the UIMC manages transitions among three UI modes.

FIG. 4 corresponds to another scenario 402 in which the UIMC transitions among three UI modes. At time t1, the UIMC presents three window instances (404, 406, 408) on a first UI presentation 410 in accordance with a first UI mode (such as a desktop UI mode). At time t2, the UIMC transitions to a second UI mode, e.g., corresponding to a tablet UI mode. In this mode, the UIMC displays two tile instances (404', 406') on a second UI presentation 412. Assume that a third tile instance '408 remains active, but is hidden at this time. Further assume that the tile instances (404', 406', 408') represent the same application instances as the respective window instances (404, 406, 408). The UIMC constructs the second UI presentation 210 by retrieving and acting on the second-mode state information that describes one or more last-encountered states of the second UI presentation 412.

At time t3, assume that the UIMC transitions to a third UI mode, such as a smartphone UI mode. In this mode, the UIMC presents a single tile instance 404" on a third UI presentation 414. Further assume that other tile instances (406", 408") remains active in the third UI presentation 414, but are not visible at time t3. Finally, again assume that the tile instances (404", 406", 408") represent the same program instances as the respective window instances (404, 406, 408) and the second-mode tile instances (404', 406', 408'). The UIMC configures the third UI presentation 414 by retrieving and acting on third-mode state information that describes one or more last-encountered states of the third UI presentation 414.

At time t4, the UIMC transitions back to the first UI mode. The UIMC responds by restoring the three window instances (404, 406, 408) to their respective states at time t1. The UIMC performs this task based on first-mode state information that describes the state at time t1.

The scenarios (302, 402) described above correspond to examples in which the UIMC relies on the kind of highest-tier state information illustrated in FIG. 1 (e.g., corresponding to information regarding a prior placement of the same program instance of the UI feature under consideration). But the UIMC can also draw on any other state information in determining how to place a UI feature, as described above in connection with FIG. 1. For example, at time t2 of FIG. 3, assume that the UIMC discovers that the second-mode state information indicates that the tile instance 304' has not yet appeared in the second UI presentation 312. In that case, the UIMC can retrieve second-mode state information pertaining to the last time that the user interacted with application a1 in the tile mode, even though that this second-mode state information does not pertain to the current application session. The UIMC can then present a tile instance 304' on the second UI presentation 312 in a manner that conforms to the retrieved second-mode state information.

More concretely stated, assume that the application a1 corresponds to a photo-editing application. In a current application session, the user is currently interacting with the photo-editing application via the desktop UI mode, but has not yet interacted with the photo-editing application via the tablet UI mode. But the second-mode state information may nevertheless indicate that, in a prior application session, the user interacted with the photo-editing application in the tablet mode in a prescribed manner. The UIMC can restore this manner of presentation when it presents the tile instance 304' for the photo-editing application in the second UI presentation 312.

According to another variation, a user may close a UI feature at any point in the user's interaction with one or more UI presentations. For example, in FIG. 3, at time t3, the user may close the tile instance 306'. The UIMC can handle this type of situation in any environment-specific way. In one case, the UIMC can assume that the user is finished interacting with the application a2 associated with the tile instance 306'. The UIMC will therefore not reconstitute the corresponding window instance 306 when it transitions back to the first UI mode at time t4. In another case, the UIMC can consult an environment-rule to determine whether it should reactivate the application a2 when it returns to the first UI mode at time t4. For example, such as rule may reflect an observation that this user (or many users) typically close(s) the application a2 in the second mode, but subsequently reactivate(s) this application a2 when moving back to the first UI mode. In this case, the rule can instruct the UIMC to automatically activate the application a2 when transitioning back to the first UI mode, even though the user has deactivated it in the second UI mode.

In another variation, pursuant to the principle introduced in FIG. 2, upon transitioning from the first UI mode to the second UI mode in FIG. 3, the UIMC can add one or more UI features that have no counterpart instances in the first UI presentation 310. Again, the UIMC can consult an environment-specific rule to determine whether or not to invoke this behavior. For example, assume that users who transition from the first UI presentation 310 (associated with a first UI mode) to the second UI presentation 312 (associated with a second UI mode) will commonly activate a new tile instance X (not shown), but only if they are currently interacting with the second window instance 306 in the first UI presentation 310 at the time of the transition. A rule can therefore be formulated which instructs the UIMC to automatically activate the new tile instance X in this specific context, even though that tile instance X has no currently active counterpart window instance in the first UI presentation 310. The UIMC can execute a similar environment-specific decision process to determine whether to omit any tile instances in the second UI presentation 312 for which there exists a counterpart window instance in the first UI presentation 310. For example, at time t2 in FIG. 3, the UIMC can apply a rule which causes it to omit the tile instance 308' in the second UI presentation 312, even though it has an active counterpart window instance 308 at the time of the transition in the first UI presentation 310.

In another variation, the UIMC can store state information on a per-group basis, rather than, or in addition to, a per-user basis. For example, the UIMC can capture state information that describes the UI-related behavior of a family, or a work unit, etc. In this case, when any member of the group advances to a second UI mode, the UIMC will reconstruct a second UI presentation based on the UI-related behavior of the group as a whole.

The above-described variations are presented in the spirit of illustration, not limitation; still other variations of the scenarios (302, 402) shown in FIGS. 3 and 4 are possible.

In general, the UIMC provides an intelligent way of automatically restoring at least a part of a UI presentation to a previous state upon a mode-change event. It performs this task by automatically restoring a UI presentation based on the user's current context, as richly expressed by context information.

The technique can be expected to provide good user experience because it eliminates or reduces the need for the user to remember the composition of a previous UI presentation. This is particularly helpful to the user when a relatively long time has elapsed since the user last interacted with a given UI mode. For example, consider the case in which the user transitions from a first UI mode to a second UI mode at the close of a work week, and then transitions from the second UI mode to the first UI mode on Monday morning. Without the UIMC, the user may have difficultly remembering the setup of the UI presentation from the previous week. Even if the user does remember a prior UI setup, the technique eliminates or reduces the need for the user to manually reconstruct any previous UI presentation.

The technique also makes efficient use of computing resources. For example, by virtue of the fact that it eliminates the need for the user to manually reconstruct a previous UI presentation, the technique can eliminate the use of computing resources that would otherwise be applied to perform this manual operation.

The technique also provides a fluid transition among UI modes, which may positively contribute to good user experience. For instance, the technique may preserve some or all of the program instances when transitioning from a first UI mode to a second UI mode, instead of, for example, presenting a blank second UI presentation upon advancing to the second UI mode. The technique can further smooth the transition among UI modes by storing some state information which is shared among UI modes, and which therefore persists in the transition between those UI modes; this feature is described in greater detail below.

Figure 5:
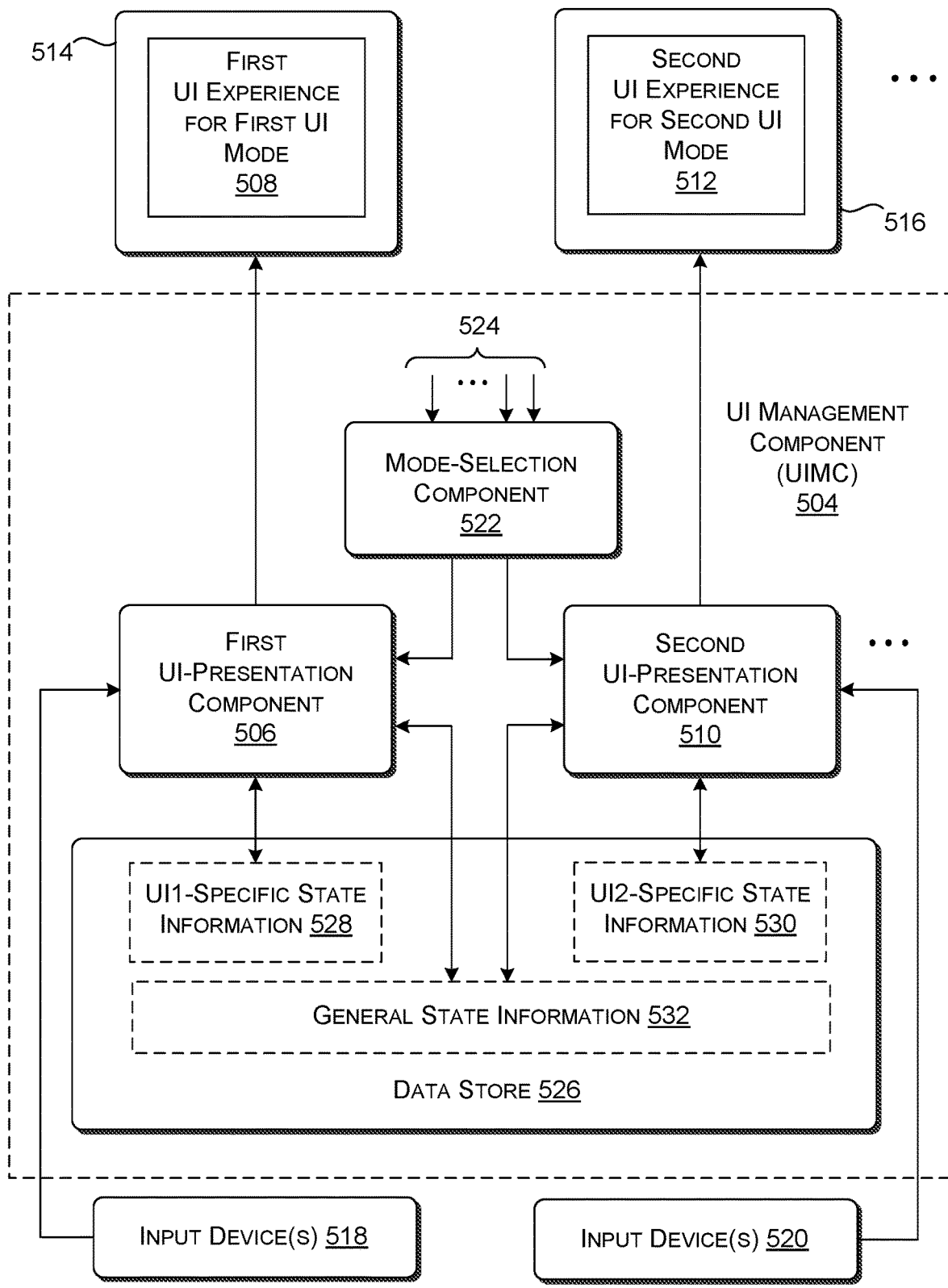
FIG. 5 shows a logical representation of the UIMC, according to one implementation.

FIG. 5 shows a computing environment 502 that includes one implementation of a UIMC 504. The UIMC 504 performs at least the functions described above in connection with FIGS. 1-4. In one implementation, an operating system of a single computing device implements the UIMC 504.

In one implementation, the UIMC 504 includes a UI-presentation component for providing a UI experience associated with each respective UI mode. For instance, the UIMC 504 can include a first UI-presentation component 506 for providing a first UI experience 508 (corresponding to a presentation of any kind) associated with a first UI mode, and a second UI-presentation component 510 for presenting a second UI experience 512 associated (corresponding to a presentation of any kind) with a second UI mode, etc. A presentation, as used herein, can include one or more UI dimensions (e.g., visual, audio, etc.). In some implementations, the various UI-presentation components (506, 510, . . . ) can draw from a common library of user interface functionality to perform their tasks. For example, the first UI-presentation component 506 can provide a first custom UI solution constructed from the common resources in the library, and the second UI-presentation component 510 can provide a second custom UI solution constructed from the common resources in the library.

The first UI-presentation component 506 can provide its UI experience 508 using a first set of one or more output devices 514. The second UI-presentation component 510 can provide its UI experience 512 using a second set of one or more output devices 516. The first set of output devices 514 can share one or more output devices with the second set of output devices 516. Or the first set may be completely different than the second set. The UIMC 504 can recognize each output device based on a device-specific ID associated with the output device and/or based on a class-specific ID associated with the output device (which identifies its general category).

The first UI-presentation component 506 can receive input signals from a first set of one or more input devices 518, while the second UI-presentation component 510 can receive input signals from a second set of one or more input device 520. The first set of input devices 518 can share one or more input devices with the second set of input devices 520. Or the first set may be completely different than the second set. The UIMC 504 can recognize each input device based on a device-specific ID associated with the input device and/or based on a class-specific ID associated with the input device (which identifies its general category).

A mode-selection component 522 receives one or more other input signals 524 from various sources. Based on these input signals 524, the mode-selection component 522 decides whether to transition between a current UI mode and a new UI mode. The input signals 524 can include, but are not limited to: a) an input signal which expresses an explicit instruction from a user; b) an input signal which indicates that the user has added a new output device (e.g., a new display device), and/or an indication that the user has removed an existing output device; c) an input signal which indicates that the user has added a new input device (e.g., a digitizer for providing touch inputs), and/or an indication that the user has removed an existing input device; d) an indication that the user has changed locations; e) an indication that some programmatic change has occurred, such as the installation of a new program, etc., and so on. The mode-selection component 522 can map the above-described input signals to an identifier of an appropriate target UI mode. It can perform this determination using any technique, such as by making reference to a data store of rules, a lookup table, etc. One such rule can specify that the UIMC 504 should transition to a particular UI mode when the user begins interacting with a display device associated with a particular class of display devices.

The UI-presentation components (506, 510) include functionality for storing state information in a data store 526. More specifically, each UI-presentation component can store some state information which is relevant to only its corresponding UI mode. For example, the first UI-presentation component 506 can store some state information 528 that is only relevant to the first UI mode, while the second UI-presentation component 510 can store some state information 530 that is only relevant to the second UI mode. In addition, each UI-presentation component can optionally store some state information 532 that is potentially relevant to two or more UI modes in which a UI feature is presented (such as background color, font size, security settings, etc.). In other words, the common state information 532 describes information regarding a UI feature that persists as the user transitions between some UI modes.

Hence, the UIMC may describe the previous state of any UI feature in a particular UI mode using a combination of mode-specific state information and mode-agnostic state information. This also means that what is referred to herein as first-mode state information may depend on some state information that is local to the first UI mode and some state information that applies to plural UI modes (including the first UI mode). Similarly, what is referred to as second-mode state information may depend on some state information that is local to the second UI mode and some state information that applies to plural UI modes (including the second UI mode), etc.

In one implementation, the UIMC 504 stores all (or some) state information in transitory memory. In that case, the UIMC 504 retains the state information only for a single user session. In another implementation, the UIMC 504 persists all (or some) state information in a permanent storage. In that case, the UIMC 504 preserves the state information across user sessions. Further note that the UIMC 504 can store the state information in one or more locations, such as in a local data store, a remote data store (e.g., as provided by one or more servers), etc.

FIG. 5 corresponds to an example in which a single operating system provides all UI modes. But in another implementation, described more fully in the context of the explanation of FIG. 7, two or more computing devices, which host respective operating systems, can cooperatively provide plural UI modes.

Figure 6:
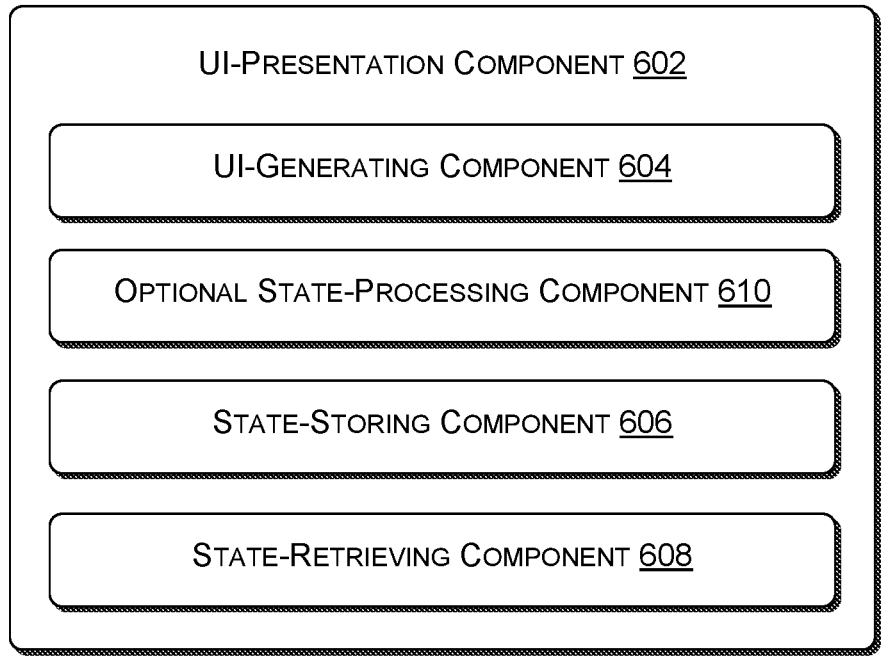
FIG. 6 shows one implementation of a UI-presentation component, for use in the UIMC of FIG. 5.

FIG. 6 shows one implementation of a UI-presentation component 602 for use in the UIMC 504 of FIG. 5. For example, the UI-presentation component 602 may correspond to the first UI-presentation component 506 or the second UI-presentation component 510 of FIG. 5. FIG. 6 shows the UI-presentation component 602 as including a self-contained collection of subcomponents. But any UI-presentation component can alternatively, or in addition, draw from a common library of functionality to perform its tasks.

A UI-generating component 604 generates a UI presentation in accordance with a particular UI mode. In a display-related context, the UI-generating component 604 can perform this task by placing graphical features at appropriate locations on the UI presentation, with appropriate sizes, etc. The UI-generating component 604 chooses the sizes, positions, etc. of the graphical features based on state information extracted from the data store 526.

A state-storing component 606 stores new state information in the data store 526, while a state-retrieving component 608 retrieves state information from the data store 526. More specifically, the state-storing component 606 stores new state information any time a change has occurred in a UI presentation in the context of a particular mode. As explained above, on each such occasion, it can store mode-specific state information and more general state information that applies to two or more UI modes. An optional state-processing component 610 processes the retrieved state information in deciding how to present a particular UI feature in a given UI mode.

Figure 7:
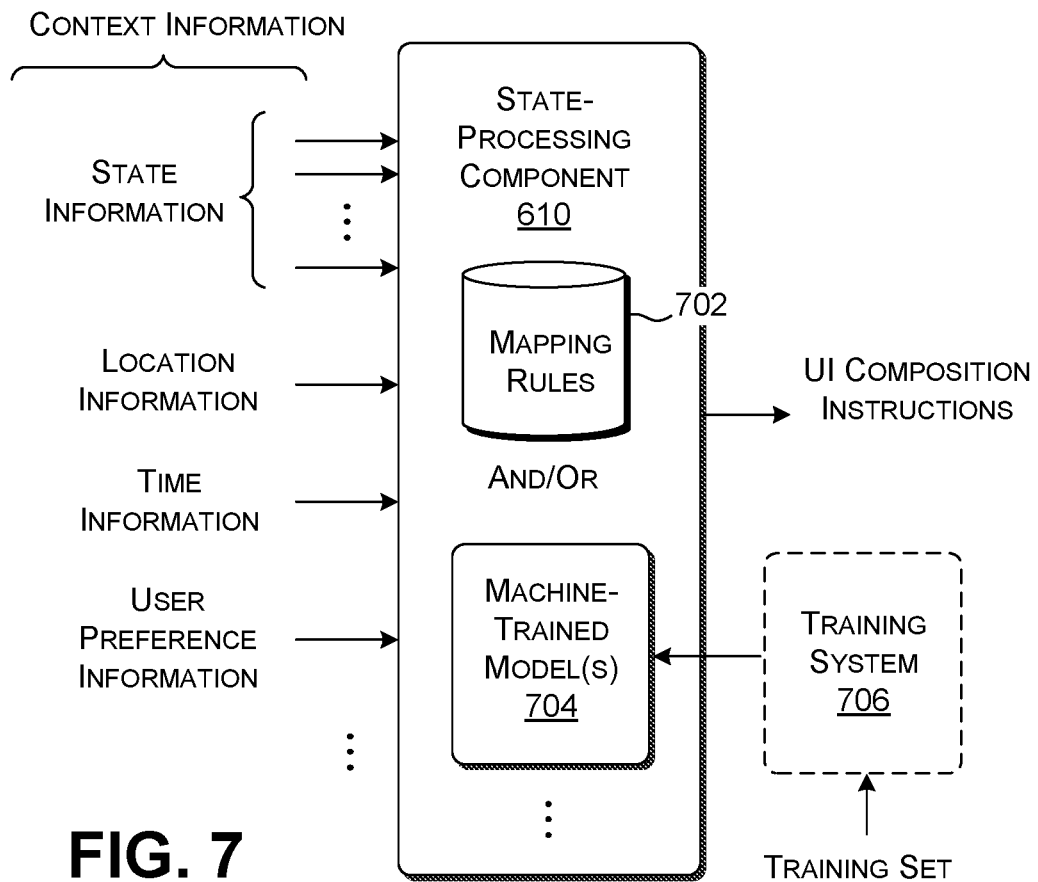
FIG. 7 shows one implementation of a state-processing component, for use in the UI-presentation component of FIG. 6.

FIG. 7 shows one implementation of the state-processing component 610, for use in the UI-presentation component 602 of FIG. 6. In one manner of operation, the UI-presentation component 602 invokes the state-processing component 610 whenever the user is transitioning from a first UI mode (associated with a first UI presentation) to a second UI mode (associated with a second UI presentation). The state-processing component 610 performs this task by receiving context information that describes the circumstances of the transition between the first UI mode and the second UI mode. It then leverages this context information to determine how to compose the second UI presentation, e.g., by determining what UI features to present in the second UI presentation, where to place them, and so on. The context information can include, but is not limited to: an identity of the first UI mode; an identity of the second UI mode; information that describes the composition of the first UI presentation (including the identity of the UI features in that presentation and the arrangement of those instances); second-mode state information; the current location; the current time; user preferences, etc.

The state-processing component 610 can map context information to output instructions using various techniques. In one approach, the state-processing component 610 can rely on a data store 702 of discrete rules to make its decision. Each such rule identifies a UI action that the UIMC 504 should take in response to the observed input conditions. For example, one rule can specify that the UIMC 504 should place a UI feature in the second UI presentation based on the state at which that same UI feature (pertaining to the same application session) was last placed in the second UI presentation, if this information is available. In other words, this rule specifies that the UIMC 504 should use the top-tier second-mode state information shown in FIG. 1, if this information is available. Other rules can vary this behavior in different ways, such as by disabling the restoration of a UI feature if the user is at certain locations, or if the current time falls within certain time spans, etc.

Other rules can depend on the way UI features are arranged in the first UI presentation. For example, a rule can specify that, in constructing the second UI presentation, the UIMC 504 should preserve the left-to-right and/or the bottom-to-top ordering of UI features exhibited by the first UI presentation, to the extent possible. Some such rules may depend on the particular identity of the UI features in the first UI presentation; other such rules may be agnostic with respect to the identity of the UI features, and thus apply to any combination of UI features arranged in a particular manner.

Other rules can indicate that a new UI feature is to be presented in the second UI presentation if certain input conditions are met, without regard to whether a counterpart UI feature is active in the first UI presentation at the time of the transition. Other rules can indicate that an existing UI feature is to be omitted from the second UI presentation (and its corresponding application deactivated), even if that UI feature had an active counterpart presence in the first UI presentation at the time of the transition.

Alternatively, or in addition, the state-processing component 610 can rely on one or more machine-trained models 704 to map context information into output instructions. In one case, the state-processing components 610 can apply a set of machine-trained models to perform this task. For instance, one kind of machine-trained model can make a binary decision as to whether or not a UI feature under consideration should be presented in the second UI presentation. Another kind of machine-trained model can determine the placement of the UI feature in the second UI presentation. Another kind of machine-trained model can determine the size of the UI feature in the second UI presentation, and so on. In another case, a machine-trained model can collectively determine all aspects of the second UI presentation's presentation, e.g., by mapping the context information to an indication of a set of UI features that should be presented in the second UI presentation, and the placement and size of each such UI feature. The state-processing component 610 can rely on any machine-trained model (or models) to perform the above-described tasks, such as logistic regression classification models, decision tree classification models, deep neural network models, sequence prediction models (e.g., implemented using recurrent neural networks, hidden Markov models, etc.), and so on.

For example, in one illustrative approach, the state-processing component 610 may map context information pertaining to a UI feature under consideration (such as a tile instance) into an input vector. The dimensions of the input vector describe respective characteristics of the context information. The state-processing component 610 can then use a deep neural network to map the input vector into an output vector or scalar. That output result can specify a location at which to place that UI feature in the second UI presentation, with respect to any environment-specific level of granularity.

A training system 706 produces a set of weighting values which collectively constitute the machine-trained model(s) 704. It performs this task by iteratively operating on a set of training examples. In one approach, each training example provides information regarding the makeup of a prior second UI presentation, along with the contextual factors associated with the generation of that UI presentation. The training system 706 can iteratively processes the training examples to achieve some stated training objective, such as maximizing the likelihood of producing a UI presentation which resembles previously-encountered UI presentations, given specified input conditions. The training system 706 can perform this task using any learning approach, such as by using the gradient descent technique.

Figure 8:
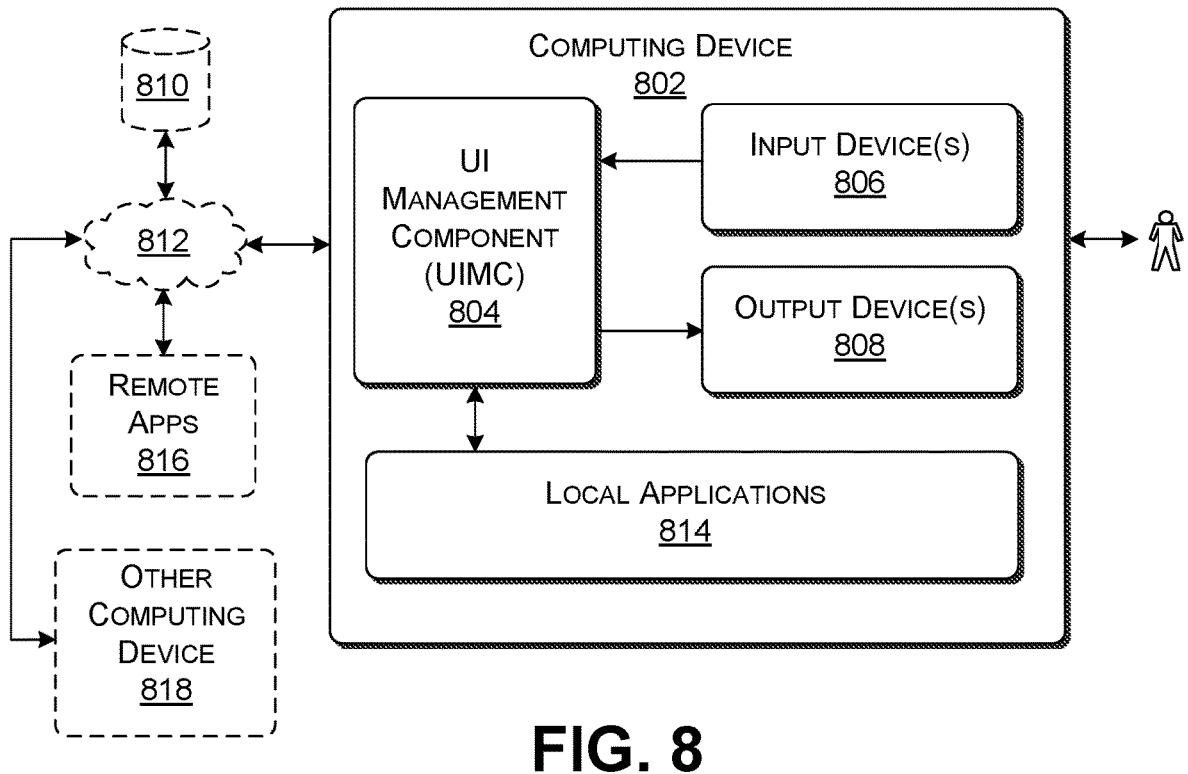
FIG. 8 shows one implementation of the UIMC of FIG. 5.

FIG. 8 shows a computing device 802 that can implement the functions described above. The computing device 802 includes a UIMC 804, one or more input devices 806, and one or more output devices 808. The operating system of the computing device 802 may implement the UIMC 804 in whole or in part. The UIMC 804 may transition between UI modes in response to instructions from the user, changes in the input devices 806, changes in the output devices 808, and so on. In some cases, the UIMC 804 may locally store its state information. Alternatively or in addition, the UIMC

804 can store its state information in a remote data store 810, accessible via a computer network 812.

The computing device 802 may store one or local applications 814. In addition, or alternatively, the computing device 802 may interact with one or more remote applications 816 (provided by one or more servers) via the computer network 812. The UIMC 804 may generate UI features in the course of the user's interaction with the applications (814, 816) and/or other programs provided by, or otherwise accessible to, the computing device 802.

In other implementations, one or more functions of the UIMC 804 can be delegated to one or more other computing devices, such as one or more remotely located servers accessible to the computing device 802 via the computer network 812. For this reason, the UIMC 804 may be said to be implemented by one or more computing devices.

In another implementation, two or more computing devices can implement the principles described above. For example, assume that a single user controls two or more computing devices, including the computing device 802 (a "first computing device") and at least one other computing device 818 (a "second computing device"). Further assume that the first computing device 802 provides a first instance of the UIMC (i.e., UIMC 804) which hosts one or more UI modes, while the second computing device 818 provides a second instance of the UIMC that also hosts one or more UI modes. There can be any degree of overlap between these two sets of UI modes (including no overlap). For example, the first computing device 802 may correspond to a desktop computing device which hosts a desktop UI mode, while the second computing device 818 corresponds to a handheld computing device which hosts a tablet UI mode. The two computing devices (802, 818) run separate operating systems.

In the above alternative case, a remote server (or servers) may implement a global service for synchronizing the operation of applications across computing devices. This global service allows a user to pause interaction with an application using the first computing device 802, and then resume interaction with the same application using the second computing device 818. In this implementation, each UIMC of each computing device continues to maintain state information that describes the placement of UI features on each local UI presentation. Alternatively, or in addition, another global service can maintain this state information for the plural computing devices (802, 818).

In one implementation, the above-described alternative system can work as follows. Assume that a user begins interacting with two applications using the first computing device 802 in a desktop UI mode. Assume that the user specifically interacts with the two applications via two respective window instances displayed on a desktop UI presentation. Next, assume that the user transitions to the second computing device 818, where he or she resumes interaction with the two applications in a tablet UI mode. In response, the UIMC of the second computing device 818 can receive a message from the first computing device 802 which specifies details regarding the transition, such as by identifying the UI features which are active in the first UI mode at the time of the transition. The UIMC of the second computing device 818 can then retrieve second-mode state information from its local data store (and/or from a global data store) that specifies how to compose a second UI presentation. The second computing device 818 will then generate a second UI presentation based on the retrieved second-mode state information.

The alternative example expands what it means for two UI features in two respective UI presentations to be considered related. In the alternative example of the operation of FIG. 8, two operating systems implement the respective first and second UI presentations. Here, a window instance (generated by the first operating system) and a tile instance (generated by the second operating system) may be considered related when they mirror the same application state, although, in some cases, these UI features may rely on two local versions of the same application.

Figure 9:
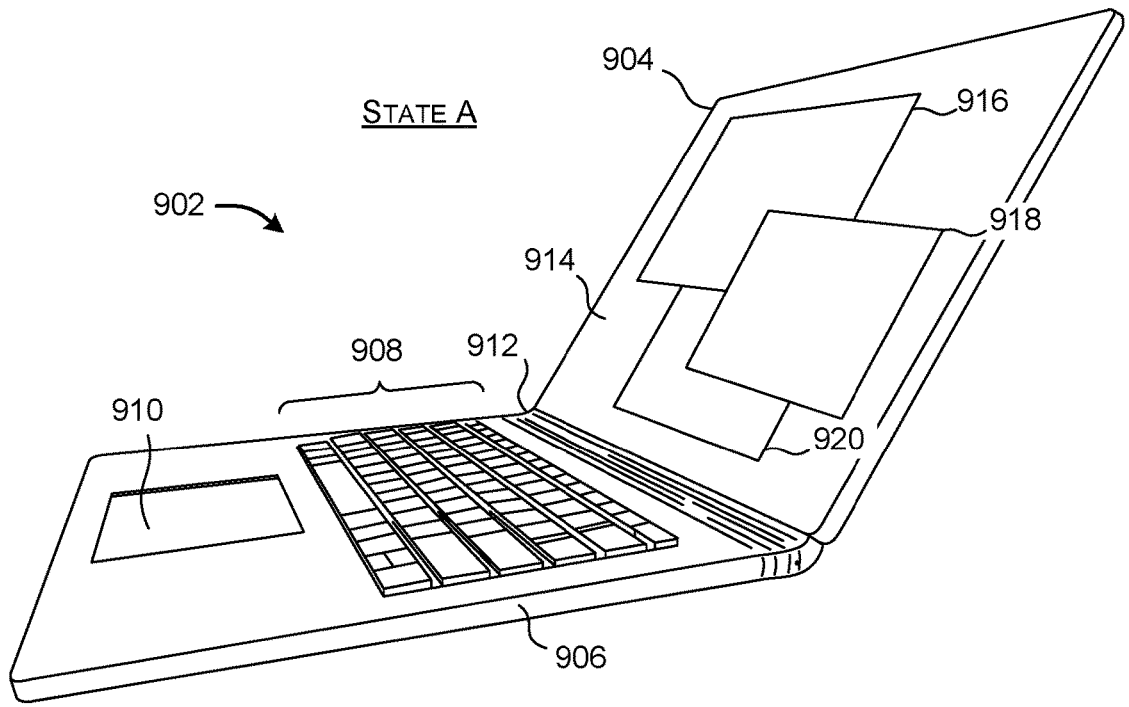
FIGS. 9 and 10 show one kind of computing device that can implement the UIMC of FIG. 5, operating in two respective UI modes.
Figure 10:
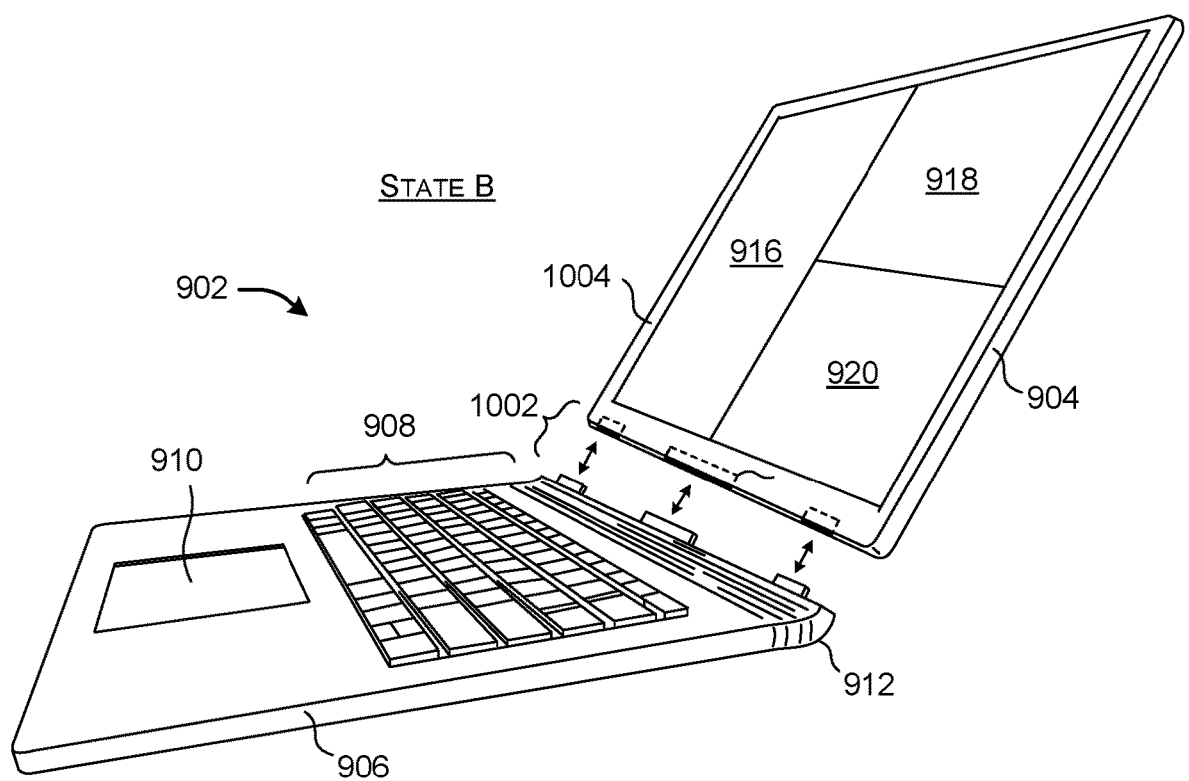

FIGS. 9 and 10 show one concrete example of a computing device 902 that can perform the functions described above (with respect to the single-computer implementation of the UIMC). With reference first to FIG. 9, the computing device 902 corresponds to a laptop computing device having a display device portion 904 and an input device portion 906. In one implementation, the display device portion 904 houses all or most of the processing logic provided by the computing device 902.

The display device portion 904 includes a display device of any type, such as a Liquid Crystal Display (LCD) display device. The display device portion 904 also includes a digitizer that is coextensive with the display device. The digitizer can detect touch inputs using any touch-sensitive input mechanism, such as a resistive mechanism, a capacitive mechanism, an optical mechanism, and/or an acoustic mechanism. Alternatively, or in addition, the digitizer (or another digitizer) can receive inputs via a digital pen, e.g., using an electromagnetic resonance mechanism. The input device portion 906 includes a keyboard 908, a trackpad 910, etc. A hinge 912 couples the display device portion 904 and the input device portion 906.

Moreover, as shown in FIG. 10, a connecting mechanism 1002 detachably couples the display device portion 904 to the input device portion 906. For example, the connecting mechanism 1002 can include one or more male protrusion members associated with the input device portion 906 which mate with complementary receptacles provided by the display device portion 904. Each complementary protrusion-receptacle pair can serve the role of mechanically coupling the two portions (904, 906) together (e.g., via complementary attracting magnets), and/or can electrically couple the two portions (904, 906) together (e.g., via a Universal Bus Interface connection, etc.).

In State A shown in FIG. 9, the computing device 902 provides a UI presentation 914 that conforms to a desktop UI mode. More specifically, in State A, the computing device 902 presents three window instances (916, 918, 920) provided by three respective applications. In state B of FIG. 10, assume that the user detaches the display device portion 904 from the input device portion 906. The UIMC of the computing device 902 treats this as a triggering event which causes it to transition to a tablet UI mode. In this UI mode, the UIMC presents a UI presentation 1004 having three tile instances (916', 918', 920'); these tile instances (916', 918', 920') respectively correspond to the window instances (916, 918, 920) presented in the first UI mode.

B. Illustrative Processes

Figure 11:
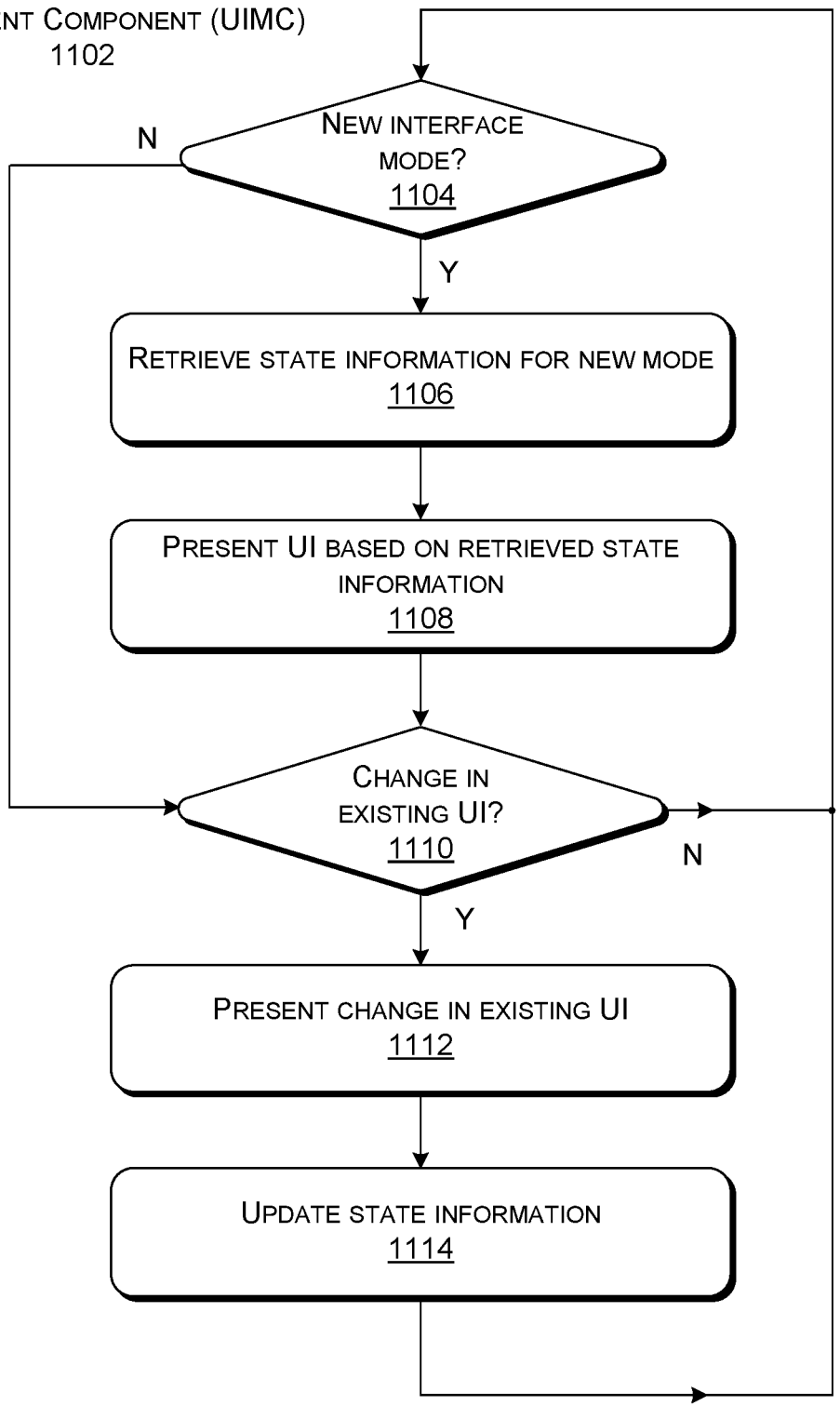
FIG. 11 shows a process that provides an overview of one manner of operation of the UIMC of FIG. 5.
Figure 12:
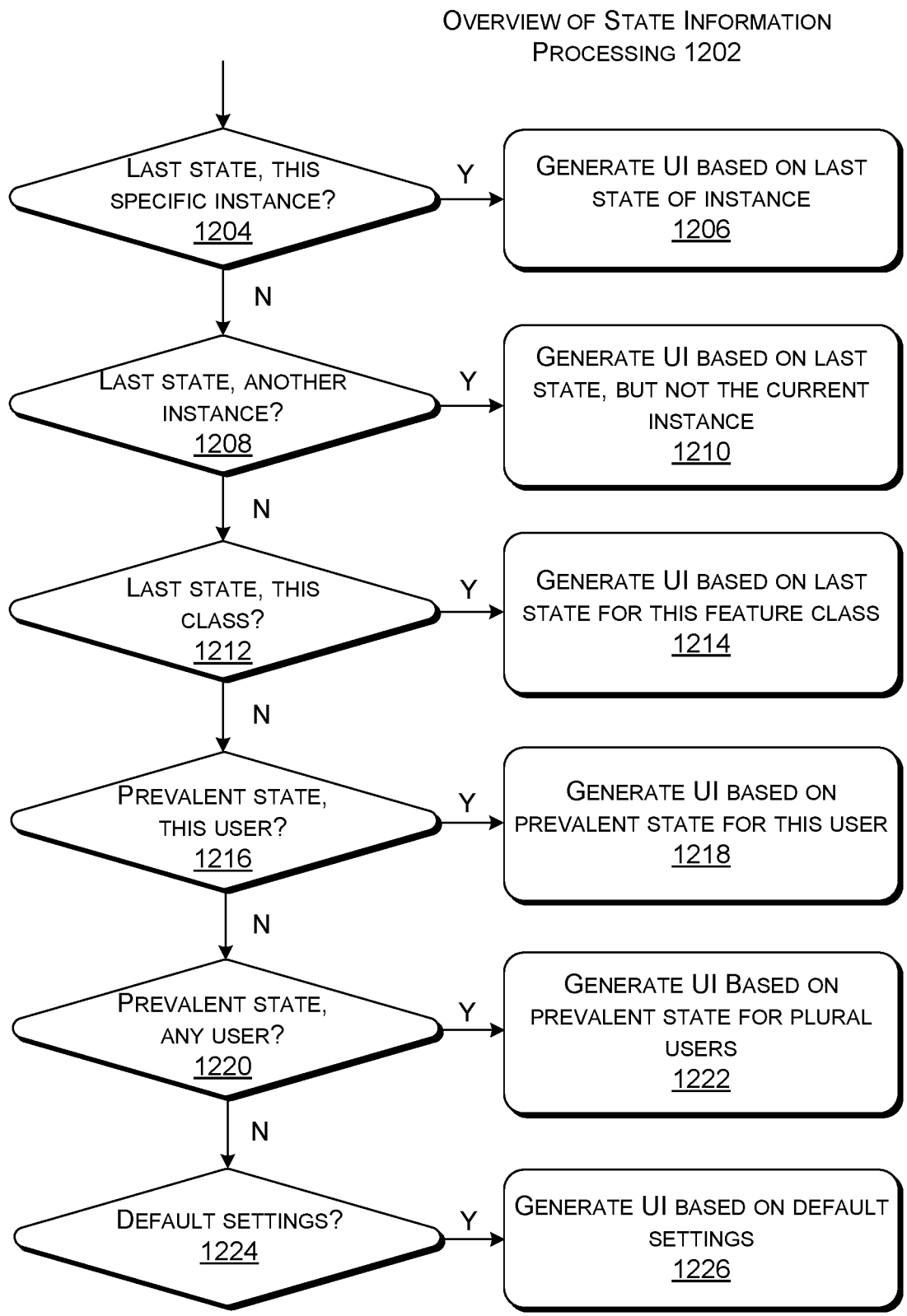
FIG. 12 shows a process that describes one non-limiting set of rules for applying state information.

FIGS. 11-13 together show processes that explain the operation of the UIMC 504 of Section A in flowchart form. Since the principles underlying the operation of the UIMC 504 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 11 shows a process 1102 that provides an overview of the operation of the UIMC 504 of FIG. 5, according to one implementation. In block 1104, the UIMC 504 determines whether an instruction has been issued to switch to a new UI mode. If so, in block 1106, the UIMC 504 retrieves state information pertaining to the new UI mode from the data store 526. In block 1108, the UIMC 504 provides a new UI presentation based on context information, including, at least in part, the state information retrieved from the data store 526. In one case, the UIMC 504 relies on the state information to restore at least one UI feature to its last-known state in the new UI mode, if possible.

In block 1110, the UIMC 504, now operating in the new UI mode, determines whether any changes have occurred which affect the new UI presentation provided by the new UI mode, such as a user's movement of a UI feature in the UI presentation, or some other change attributed to another state-change event. If so, in block 1112, the UIMC 504 shows or otherwise reveals the changes that have been made on the appropriate output device(s). In block 1114, the UIMC 504 also updates the state information stored in the data store 526 to reflect the change(s) that have been made.

FIG. 12 shows a process 1202 that describes one non-limiting set of rules for applying state information upon transitioning from a first UI mode (associated with a first UI presentation) to a second UI mode (associated with a second UI presentation). In this example, the UIMC 504 processes the state information in hierarchical fashion. But as noted above, the UIMC 504 can also jointly take into consideration two or more separate items of weighted state information in deciding how to construct the second UI presentation. FIG. 12 will be explained in the illustrative context of determining how to place a UI feature Z in a second UI presentation, as shown in FIG. 1. Again assume that an application a1 produces the UI feature Z in the context of operation on a content item C.

In block 1204, the UIMC 504 determines whether the data store 526 stores second-mode state information regarding the last state of the specific UI feature Z under consideration (that is, corresponding to the same instantiation of the application a1). If so, in block 1206, the UIMC 504 presents the UI feature Z (e.g., a tile instance) in the second presentation based on the retrieved state information.

In block 1208, the UIMC 504 determines whether the data store 526 stores second-mode state information regarding the last state of another feature Z' produced by another instantiation of the same application a1, not the current instantiation. Or the UIMC 504 determines whether the data store 526 stores second-mode state information regarding a last state of a UI feature Z' produced by any application that operates on the same content item C. If block 1208 is answered in the affirmative, then, in block 1210, the UIMC 504 presents the UI feature Z in the second presentation based on the retrieved state information.

In block 1212, the UIMC 504 determines whether the data store 526 stores second-mode information regarding a last state of a UI feature Z' produced by a general class of applications, of which application a1 is a member. If block 1212 is answered in the affirmative, then, in block 1214, the UIMC 504 presents the UI feature Z in the second presentation based on the retrieved state information.

In block 1216, the UIMC 504 determines whether the data store 526 stores several instances of state information that have a bearing on how the UI feature Z (and/or other UI features related to the UI feature Z) has/have been presented to the current user on prior occasions, with respect to the current context. If block 1214 is answered in the affirmative, then, in block 1218, the UIMC 504 presents the UI feature Z in the second presentation based on the retrieved state information, e.g., by leveraging the several instances of state information to choose a most popular feature position, an average feature position, etc. In blocks 1220 and 1222, the UIMC 504 performs the same analysis specified above (for blocks 1216 and 1218), but broadened to include the UI-related behavior of other people in addition to the current user.

In blocks 1224 and 1226, the UIMC 504 presents the UI feature in accordance with default settings, if there are any default settings that are relevant to the current context.

FIG. 13 shows a process 1302 that represents another way of expressing aspects of the process 1302 of FIG. 11. In block 1304, the UIMC 504 presents a first UI presentation using at least one first output device, the first UI presentation provides a first set of one or more first-set UI features, provided in a manner that conforms to a first UI mode. A user may interact with the first UI mode using at least one first input device. In block 1306, the UIMC 504 receives one or more input signals, indicating that a state-change event has occurred to change a state of at least one first-set UI feature associated with the first UI presentation. The state-change event may reflect an action explicitly performed by the user via an input device, or some other change that affects the first UI presentation. In block 1308, the UIMC 504 updates the first UI presentation provided by the first output device based on the input signal(s). In block 1310, the UIMC 504 updates first-mode state information in a data store 526 based on the input signal(s), the first-mode state information describing respective states of UI features that were provided in previous presentations conforming to the first UI mode. In block 1312, the UIMC 504 determines, based on one or more other input signals, whether to transition to a second UI mode. The UIMC 504 transitions to the second UI mode if the determining operation results in an affirmative response. In block 1314, if the determining operation results in an affirmative response, the UIMC 504 retrieves second-mode state information from the data store 526; the second-mode state information describes respective states of UI features that were provided in previous presentations conforming to the second UI mode. In block 1316, the UIMC 504 presents a second UI presentation using at least one second output device. The second UI presentation shows a second set of one or more second-set UI features that conform to the second UI mode. The user interacts with the second UI mode using at least one second input device. Block 1316 is performed based on at least the second-mode state information, and has the effect of restoring at least one second-set UI feature to a previously-encountered state.

C. Representative Computing Functionality

Figure 14:
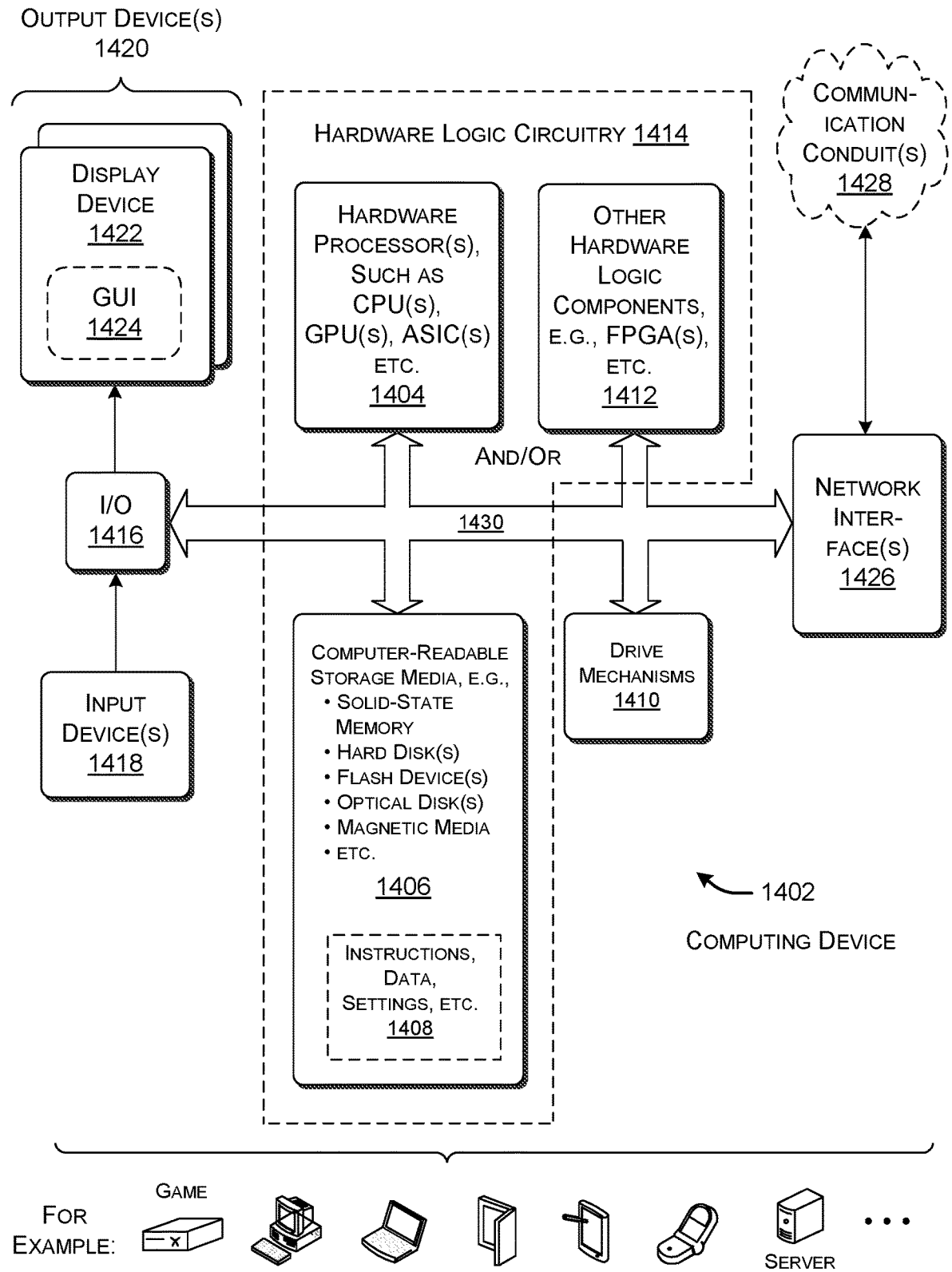
FIG. 14 shows an illustrative type of computing device that can be used to implement any aspect of the features shown in the foregoing drawings.

FIG. 14 shows a computing device 1402 that can be used to implement any aspect of the mechanisms set forth in the above-described figures. For instance, with reference to FIG. 8, the type of computing device 1402 shown in FIG. 14 can be used to implement the computing device 802. In all cases, the computing device 1402 represents a physical and tangible processing mechanism.

The computing device 1402 can include one or more hardware processors 1404. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1402 can also include computer-readable storage media 1406, corresponding to one or more computer-readable media hardware units. The computer-readable storage media 1406 retains any kind of information 1408, such as machine-readable instructions, settings, data, etc. Without limitation, for instance, the computer-readable storage media 1406 may include one or more solid-state devices, one or more magnetic hard disks, one or more optical disks, magnetic tape, and so on. Any instance of the computer-readable storage media 1406 can use any technology for storing and retrieving information. Further, any instance of the computer-readable storage media 1406 may represent a fixed or removable component of the computing device 1402. Further, any instance of the computer-readable storage media 1406 may provide volatile or non-volatile retention of information.

The computing device 1402 can utilize any instance of the computer-readable storage media 1406 in different ways. For example, any instance of the computer-readable storage media 1406 may represent a hardware memory unit (such as Random Access Memory (RAM)) for storing transient information during execution of a program by the computing device 1402, and/or a hardware storage unit (such as a hard disk) for retaining/archiving information on a more permanent basis. In the latter case, the computing device 1402 also includes one or more drive mechanisms 1410 (such as a hard drive mechanism) for storing and retrieving information from an instance of the computer-readable storage media 1406.

The computing device 1402 may perform any of the functions described above when the hardware processor(s) 1404 carry out computer-readable instructions stored in any instance of the computer-readable storage media 1406. For instance, the computing device 1402 may carry out computer-readable instructions to perform each block of the processes described in Section B.

Alternatively, or in addition, the computing device 1402 may rely on one or more other hardware logic components 1412 to perform operations using a task-specific collection of logic gates. For instance, the hardware logic component(s) 1412 may include a fixed configuration of hardware logic gates, e.g., that are created and set at the time of manufacture, and thereafter unalterable. Alternatively, or in addition, the other hardware logic component(s) 1412 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 14 generally indicates that hardware logic circuitry 1414 corresponds to any combination of the hardware processor(s) 1404, the computer-readable storage media 1406, and/or the other hardware logic component(s) 1412. That is, the computing device 1402 can employ any combination of the hardware processor(s) 1404 that execute machine-readable instructions provided in the computer-readable storage media 1406, and/or one or more other hardware logic component(s) 1412 that perform operations using a fixed and/or programmable collection of hardware logic gates.

In some cases (e.g., in the case in which the computing device 1402 represents a user computing device), the computing device 1402 also includes an input/output interface 1416 for receiving various inputs (via input devices 1418), and for providing various outputs (via output devices 1420). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1422 and an associated graphical user interface presentation (GUI) 1424. The display device 1422 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1402 can also include one or more network interfaces 1426 for exchanging data with other devices via one or more communication conduits 1428. One or more communication buses 1430 communicatively couple the above-described components together.

The communication conduit(s) 1428 can be implemented in any manner, e.g., by a local area computer network, a wide area computer network (e.g., the Internet), point-to-point connections, etc., or any combination thereof. The communication conduit(s) 1428 can include any combination of hardwired links, wireless links, routers, gateway functionality, name servers, etc., governed by any protocol or combination of protocols.

FIG. 14 shows the computing device 1402 as being composed of a discrete collection of separate units. In some cases, the collection of units may correspond to discrete hardware units provided in a computing device chassis having any form factor. FIG. 14 shows illustrative form factors in its bottom portion. In other cases, the computing device 1402 can include a hardware logic component that integrates the functions of two or more of the units shown in FIG. 1. For instance, the computing device 1402 can include a system on a chip (SoC or SOC), corresponding to an integrated circuit that combines the functions of two or more of the units shown in FIG. 14.

The following summary provides a non-exhaustive set of illustrative aspects of the technology set forth herein.

According to a first aspect, one or more computing devices for presenting a user interface (UI) experience are described. The computing device(s) include hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include: presenting a first UI presentation using at least one first output device, the first UI presentation providing a first set of one or more first-set UI features, provided in a manner that conforms to a first UI mode, a user interacting with the first UI mode using at least one first input device; receiving one or more input signals, indicating that a state-change event has occurred to change a state of at least one first-set UI feature associated with the first UI presentation; updating the first UI presentation provided by the aforementioned at least one first output device based on the aforementioned one or more input signals; and updating first-mode state information in a data store based on the aforementioned one or more input signals, the first-mode state information describing respective states of UI features that were provided by previous presentations conforming to the first UI mode. The operations also include determining, based on one or more other input signals, whether to transition to a second UI mode. The operations also include: if the determining operation results in an affirmative response, retrieving second-mode state information from the data store, the second-mode state information describing respective states of UI features that were provided by previous presentations conforming to the second UI mode; and presenting a second UI presentation using at least one second output device, the second UI presentation providing a second set of one or more second-set UI features that conform to the second UI mode, the user interacting with the second UI mode using at least one second input device. The presenting of the second UI presentation is based at least on the second-mode state information, the aforementioned presenting of the second UI presentation having an effect of restoring at least one of the aforementioned one or more second-set UI features to a previously-encountered state.

According to a second aspect, a set of output devices defined by the aforementioned at least one second output device and a set of output devices defined by the aforementioned at least one first output device include at least one common output device.

According to a third aspect, a set of output devices defined by the aforementioned at least one second output device includes at least one member that is not present in a set of output devices defined by the aforementioned at least one first output device.

According to a fourth aspect, the aforementioned updating of the first-mode state information includes: updating mode-specific state information that pertains to only the first UI mode; and updating general state information that pertains to two or more UI modes.

According to a fifth aspect, each second-set UI feature corresponds to a graphical object instance presented on at least one display device, and the aforementioned presenting of the second UI presentation involves restoring each graphical object instance to a previously-encountered position and/or size of the graphical object instance.

According to a sixth aspect, for at least one case, a second-set UI feature corresponds to a same instantiation of a same program resource as a counterpart first-state UI feature.

According to a seventh aspect, the aforementioned presenting of the second UI presentation involves, for a second-set UI feature Z in the second set, restoring the second-set UI feature Z to a state at which a same instance of the second-set UI feature Z was previously placed in the second UI presentation.

According to an eighth aspect, the aforementioned presenting of the second UI presentation involves, for a second-set UI feature Z in the second set, restoring the second-set UI feature Z to a state at which another second-set UI feature Z' was previously placed in the second UI presentation, the second-set UI feature Z and the second-set UI feature Z' being related.

According to a ninth aspect (dependent on the eighth aspect), the second-set UI features (Z, Z') are related because they are generated by a same program resource.

According to a tenth aspect (dependent on the eighth aspect), the second-set UI features (Z, Z') are related because they pertain to a same content item.

According to an eleventh aspect (dependent on the eighth aspect), the second-set UI features (Z, Z') are related because they pertain to a same category of program resources, and/or a same category of content items.

According to a twelfth aspect, the aforementioned presenting of the second UI presentation involves, for a second-set UI feature Z in the second set, restoring the second-set UI feature Z to a state based on a consideration of how plural other second-set UI features have been previously placed in the second UI presentation on prior occasions, the second-set UI feature Z and the plural other second-set UI features being related to each other.

According to a thirteenth aspect, the aforementioned presenting of the second UI presentation involves, for a second-set UI feature Z in the second set, restoring the second-set UI feature Z to a state based on a consideration of second-mode state information pertaining to at least a current user.

According to a fourteenth aspect, the aforementioned presenting of the second UI presentation involves, for a second-set UI feature Z in the second set, restoring the second-set UI feature Z to a state based on a consideration of second-mode state information pertaining to plural users.

According to a fifteenth aspect, the aforementioned presenting of the second UI presentation involves, for a second-set UI feature Z in the second set, restoring the second-set UI feature Z to a state by identifying second-mode state information in the data store that is most relevant to the second-set UI feature Z.

According to a sixteenth aspect, the aforementioned presenting of the second UI presentation involves presenting at least one second-set UI feature that has no counterpart instance in the first UI presentation.

According to a seventeenth aspect, the operations further include, for at least one second-set UI feature Z in the second set: identifying context information pertinent to presentation of the UI feature Z in the second UI presentation, at least some of the context information pertaining to the second-mode state information; mapping the context information into output instructions; and presenting the UI feature Z in the second UI presentation based on the output instructions.

According to an eighteenth aspect, a method for present a UI experience is described. The method includes: presenting a first UI presentation using at least one first output device, the first UI presentation providing a first set of one or more first-set UI features, provided in a manner that conforms to a first UI mode, a user interacting with the first UI mode using at least one first input device; receiving one or more input signals, indicating that a state-change event has occurred to change a state of at least one first-set UI feature associated with the first UI presentation; updating the first UI presentation provided by the aforementioned at least one first output device based on the aforementioned one or more input signals; updating first-mode state information in a data store based on the aforementioned one or more input signals, the first-mode state information describing respective states of UI features that were provided by previous presentations conforming to the first UI mode; transitioning to a second UI mode in response to a triggering event; retrieving second-mode state information from the data store, the second-mode state information describing respective states of UI features that were provided by previous presentations conforming to the second UI mode; and presenting a second UI presentation using at least one second output device, the second UI presentation providing a second set of one or more second-set UI features that conform to the second UI mode, the user interacting with the second UI mode using at least one second input device. The presenting of the second UI presentation is based at least on the second-mode state information. Further, the presenting of the second UI presentation has an effect of restoring at least one of the aforementioned one or more second-set UI features to a previously-encountered state. Further, for at least one case, a second-set UI feature corresponds to a same instantiation of a same program resource as a counterpart first-state UI feature.

According to a nineteenth aspect (dependent on the eighteenth aspect), the presenting of the second UI presentation involves, for a second-set UI feature Z in the second set, restoring that second-set UI feature Z to a state at which a same instantiation of the second-set UI feature Z was previously placed in the second UI presentation.

According to a twentieth aspect, a computer-readable storage medium for storing computer-readable instructions is described. The computer-readable instructions, when executed by one or more hardware processors, provide a first UI-presentation component, a mode-selection component, and a second UI-presentation component. The first UI-presentation component is configured to: present a first UI presentation using at least one first output device, the first UI presentation providing a first set of one or more first-set UI features, provided in a manner that conforms to a first UI mode, a user interacting with the first UI mode using at least one first input device; receive one or more input signals, indicating that a state-change event has occurred to change a state of at least one first-set UI feature associated with the first UI presentation; update the first UI presentation provided by the aforementioned at least one first output device based on the aforementioned one or more input signals; and update first-mode state information in a data store based on the aforementioned one or more input signals, the first-mode state information describing respective states of UI features that were provided by previous presentations conforming to the first UI mode. The mode-selection component is configured to determine, based on one or more other input signals, whether to transition to a second UI mode. The second UI-presentation component is configured, upon transfer to the second UI mode, to: retrieve second-mode state information from the data store, the second-mode state information describing respective states of UI features that were provided by previous presentations conforming to the second UI mode; and present a second UI presentation using at least one second output device, the second UI presentation providing a second set of one or more second-set UI features that conform to the second UI mode, the user interacting with the second UI mode using at least one second input device. The second UI-presentation component is configured to present the second UI presentation based at least on the second-mode state information, to thereby restore at least one of the second-set UI features to a previously-encountered state. Further, for at least one case, a second-set UI feature corresponds to a same instantiation of a same program resource as a counterpart first-state UI feature.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for presenting a user interface (UI) experience, comprising:
   hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
   presenting a first UI presentation using at least one first output device, the first UI presentation providing a first set of one or more UI features, provided in a manner that conforms to a first UI mode, a user interacting with the first UI mode using at least one first input device;
   receiving one or more input signals, indicating that a state-change event has occurred to change a state of at least one UI feature in the first set associated with the first UI presentation;
   updating the first UI presentation provided by said at least one first output device based on said one or more input signals;
   updating first-mode state information in a data store based on said one or more input signals, the first-mode state information describing respective states of UI features that were provided by previous presentations conforming to the first UI mode;
   determining, based on one or more other input signals, to transition to a second UI mode;
   in response to said determining, retrieving second-mode state information from the data store, the second-mode state information describing respective states of UI features that were provided by previous presentations conforming to the second UI mode; and
   presenting a second UI presentation using at least one second output device, the second UI presentation providing a second set of one or more UI features that conform to the second UI mode, the user interacting with the second UI mode using at least one second input device,
   said presenting of the second UI presentation being based at least on the second-mode state information,
   said presenting of the second UI presentation involving, for a feature Z in the second set, restoring the feature Z to a state based on a state at which another feature Z' was previously placed in a UI presentation conforming to the second UI mode, the feature Z and the feature Z' being related but not being produced by a same instantiation of a same program resource.

2. The one or more computing devices of claim 1, wherein a set of output devices defined by said at least one second output device and a set of output devices defined by said at least one first output device include at least one common output device.

3. The one or more computing devices of claim 1, wherein a set of output devices defined by said at least one second output device includes at least one member that is not present in a set of output devices defined by said at least one first output device.

4. The one or more computing devices of claim 1, wherein said updating of the first-mode state information comprises:
updating mode-specific state information that pertains to only the first UI mode; and
updating general state information that pertains to two or more UI modes.

5. The one or more computing devices of claim 1,
wherein the UI feature Z in the second set corresponds to a graphical object instance presented on at least one display device, and
wherein said presenting of the second UI presentation involves restoring the graphical object instance to a position and/or size of a previously-presented graphical object instance associated with the UI feature Z'.

6. The one or more computing devices of claim 1, wherein another UI feature in the second set is produced by a same instantiation of a same program resource as a counterpart UI feature in the first set.

7. The one or more computing devices of claim 1, wherein said presenting of the second UI presentation involves, for another UI feature in the second set, restoring the other UI feature to a state at which a same instance of the other UI feature was previously placed in a UI presentation conforming to the second UI mode.

8. The one or more computing devices of claim 1, wherein the UI features Z and Z' are related because the UI features Z and Z' are generated by the same program resource, but are not produced by the same instantiation of the program resource.

9. The one or more computing devices of claim 1, wherein the UI features Z and Z' are related because the UI features Z and Z' pertain to a same content item.

10. The one or more computing devices of claim 1, wherein the UI features Z and Z' are related because the UI features Z and Z' pertain to a same category of program resources, and/or a same category of content items.

11. The one or more computing devices of claim 1, wherein said presenting of the second UI presentation involves, for the UI feature Z in the second set, restoring the UI feature Z to a state based on a consideration of how plural other UI features, including the UI feature Z', have been previously placed in UI presentations conforming to the second UI mode on prior occasions, the UI feature Z and the plural other UI features being related to each other.

12. The one or more computing devices of claim 1, wherein said presenting of the second UI presentation involves, for the UI feature Z in the second set, restoring the UI feature Z to a state based on a consideration of second-mode state information pertaining to at least a current user.

13. The one or more computing devices of claim 11, wherein the operations include restoring the UI feature Z in the second set to a state based on a most popular placement among plural prior placements of the plural other UI features, or an average of the plural prior placements.

14. The one or more computing devices of claim 1, wherein said presenting of the second UI presentation involves, for the UI feature Z in the second set, restoring the UI feature Z to a state based on a consideration of second-mode state information pertaining to plural users.

15. The one or more computing devices of claim 1, wherein said presenting of the second UI presentation involves, for the UI feature Z in the second set, restoring the UI feature Z to a state by identifying second-mode state information in the data store that is most relevant to the UI feature Z.

16. The one or more computing devices of claim 1, wherein said presenting of the second UI presentation involves presenting at least one UI feature in the second set that has no counterpart instance in the first UI presentation.

17. The one or more computing devices of claim 1, wherein the operations further include, for the UI feature Z in the second set:
identifying context information pertinent to presentation of the UI feature Z in the second UI presentation, at least some of the context information pertaining to the second-mode state information;
mapping the context information into output instructions; and
presenting the UI feature Z in the second UI presentation based on the output instructions.

18. A method for presenting a UI experience, comprising:
presenting a first UI presentation using at least one first output device, the first UI presentation providing a first set of one or more UI features, provided in a manner that conforms to a first UI mode, a user interacting with the first UI mode using at least one first input device;
receiving one or more input signals, indicating that a state-change event has occurred to change a state of at least one UI feature in the first set associated with the first UI presentation;
updating the first UI presentation provided by said at least one first output device based on said one or more input signals;
updating first-mode state information in a data store based on said one or more input signals, the first-mode state information describing respective states of UI features that were provided by previous presentations conforming to the first UI mode;
transitioning to a second UI mode in response to a triggering event;
retrieving second-mode state information from the data store, the second-mode state information describing respective states of UI features that were provided by previous presentations conforming to the second UI mode; and
presenting a second UI presentation using at least one second output device, the second UI presentation providing a second set of one or more UI features that conform to the second UI mode, the user interacting with the second UI mode using at least one second input device,
said presenting of the second UI presentation being based at least on the second-mode state information,
wherein the second-mode state information includes a hierarchy of state information items having varying respective degrees of relevance to a placement of a UI feature Z in the second set in the second UI presentation, any of the state information items being capable of being used to determine placement of the UI feature Z in the second UI presentation,
wherein said presenting the second UI presentation involves identifying a most relevant state information item from the hierarchy, and utilizing at least the most relevant state information item in placing the UI feature Z in the second UI presentation, wherein the feature Z is an instantiated window produced by a program resource, and wherein the most relevant state information item describes a last placement of the same instantiated window in a UI presentation conforming to the second UI mode.

19. The method of claim 18, wherein a next most relevant state information item describes a last placement of another instance of a window produced by the program resource in a UI presentation conforming to the second UI mode.

20. A computer-readable storage medium for storing computer-readable instructions, the computer-readable instructions, when executed by one or more hardware processors, providing:

a first UI-presentation component configured to:
present a first UI presentation using at least one first output device, the first UI presentation providing a first set of one or more UI features, provided in a manner that conforms to a first UI mode, a user interacting with the first UI mode using at least one first input device;
receive one or more input signals, indicating that a state-change event has occurred to change a state of at least one UI feature in the first set associated with the first UI presentation;
update the first UI presentation provided by said at least one first output device based on said one or more input signals; and
update first-mode state information in a data store based on said one or more input signals, the first-mode state information describing respective states of UI features that were provided by previous presentations conforming to the first UI mode;

a mode-selection component configured to determine, based on one or more other input signals, to transition to a second UI mode; and a second UI-presentation component configured, upon transfer to the second UI mode, to:
retrieve second-mode state information from the data store, the second-mode state information describing respective states of UI features that were provided by previous presentations conforming to the second UI mode; and
present, in a presenting operation, a second UI presentation using at least one second output device, the second UI presentation providing a second set of one or more UI features that conform to the second UI mode, the user interacting with the second UI mode using at least one second input device,
the second UI-presentation component being configured to present the second UI presentation based at least on the second-mode state information,
for at least one case, a UI feature in the second set corresponds to a same instantiation of a same program resource as a counterpart UI feature in the first set, and
for another case, said presenting of the second UI presentation involves, for a UI feature Z in the second set, restoring the UI feature Z to a state based on a state at which another UI feature Z' was previously placed in a UI presentation conforming to the second UI mode, the UI feature Z and the UI feature Z' being related but not being produced by a same instantiation of a same program resource.

* * * * *